United States Patent
Li et al.

(10) Patent No.: US 12,232,439 B2
(45) Date of Patent: Feb. 25, 2025

(54) SEED PRODUCTION APPARATUS AND METHOD BASED ON MULTISTAGE SCREENING AND BUD EYE IDENTIFICATION

(71) Applicants: Qingdao University of Technology, Qingdao (CN); Institute of Agricultural Mechanization, Xinjiang Academy of Agricultural Sciences, Urumqi (CN); Inner Mongolia University For Nationalities, Tongliao (CN)

(72) Inventors: Changhe Li, Qingdao (CN); Huayang Zhao, Qingdao (CN); Dongzhou Jia, Qingdao (CN); Rong Wang, Qingdao (CN); Huimin Yang, Qingdao (CN); Jia Shi, Qingdao (CN); Yezhen Peng, Qingdao (CN); Peng Gong, Qingdao (CN); Qiyu Zhou, Qingdao (CN); Deju Li, Qingdao (CN); Zongbin Yuan, Qingdao (CN); Yali Hou, Qingdao (CN)

(73) Assignees: Qingdao University of Technology, Qingdao (CN); Institute of Agricultural Mechanization, Xinjiang Academy of Agricultural Sciences, Urumqi (CN); Inner Mongolia University For Nationalities, Tongliao (CN)

( * ) Notice: Subject to any disclaimer, the term of this patent is extended or adjusted under 35 U.S.C. 154(b) by 764 days.

(21) Appl. No.: 17/349,725

(22) Filed: Jun. 16, 2021

(65) Prior Publication Data
US 2021/0392809 A1     Dec. 23, 2021

(30) Foreign Application Priority Data

Jun. 17, 2020 (CN) .......................... 202010556037.8

(51) Int. Cl.
*A01C 1/06* (2006.01)
*A01C 1/00* (2006.01)
*A01C 1/08* (2006.01)

(52) U.S. Cl.
CPC ................ *A01C 1/005* (2013.01); *A01C 1/06* (2013.01); *A01C 1/08* (2013.01)

(58) Field of Classification Search
CPC .. A01C 1/08; A01C 1/005; A01C 1/06; A01C 1/025; B26D 3/26
(Continued)

(56) References Cited

FOREIGN PATENT DOCUMENTS

| CN | 102742393 A | 10/2012 |
|---|---|---|
| CN | 103283344 A | 9/2013 |

(Continued)

*Primary Examiner* — Nhat Chieu Q Do
(74) *Attorney, Agent, or Firm* — Hayes Soloway PC

(57) ABSTRACT

An intelligent seed production apparatus and method based on multistage screening and bud eye identification includes a feeding module, a pre-cutting module, a bud eye identifying and cutting module, and a material mixing module. The feeding module can screen out seed potatoes with the mass and shapes meeting the requirements through a multistage screening mechanism. The pre-cutting module can receive the seed potatoes discharged from the feeding module, and cut each seed potato in half; the bud eye identifying and cutting module can receive the seed potato pieces discharged from the pre-cutting module and determine the weight of the seed potatoes and identify the bud eye distribution on the surfaces of the seed potatoes, and cut the seed potato into multiple required tubers, so that bud eyes are distributed on different tubers uniformly. The material mixing module can receive the cut tubers, and complete the material mixing of the tubers.

6 Claims, 17 Drawing Sheets

(58) Field of Classification Search
USPC .......................................................... 83/417
See application file for complete search history.

(56) References Cited

FOREIGN PATENT DOCUMENTS

| CN | 109089467 A | * 12/2018 | ............... A01C 1/00 |
| --- | --- | --- | --- |
| CN | 110100525 A | 8/2019 | |
| CN | 111699779 A | 9/2020 | |

* cited by examiner

SEED PRODUCTION APPARATUS AND METHOD BASED ON MULTISTAGE SCREENING AND BUD EYE IDENTIFICATION

CROSS REFERENCE TO RELATED APPLICATION

This patent application claims the benefit and priority of Chinese Patent Application 202010556037.8 filed on Jun. 17, 2020, the disclosure of which is incorporated by reference herein in its entirety.

TECHNICAL FIELD

The present disclosure belongs to the technical field of agricultural machinery, and in particular to an intelligent seed production apparatus and method based on multistage screening and bud eye identification.

BACKGROUND ART

The statements in this part only provide background technical information related to the present disclosure and do not necessarily constitute the prior art.

Potatoes are an important food crop next only to rice, corns, and wheats. As the potatoes are a tuberous root crop that propagates in a vegetative manner, tuberous roots are used for sowing when the potatoes are planted. Tuberous roots within a preset weight range can be obtained by cutting the roots of the tuberous root crop that propagates in a vegetative manner. A mass of an overall seed potato to be cut should be controlled to be 50 g to 160 g. The seed potato is not cut if it is less than 50 g. When the overall seed potato of 50 to 160 g is cut, a mass of the potato piece is generally controlled to be between 25 g and 30 g, and at least one bud eye must be remained on each cut piece. Therefore, different cutting methods are adopted when the seed potatoes with different sizes are symmetrically and longitudinally cut along major axes. A single piece of seed potato less than 50 g is not cut. A seed potato of 51 to 75 g is longitudinally cut in half. A seed potato greater than 75 g is cut in half first and then each half is cut into three pieces. After the seed potatoes are cut, the seed potato cut pieces need to be disinfected by solid or liquid (such as plant ash) and a solid chemical preparation, so as to ensure a good growth rate and prevent the roots from being rotten.

At present, the seed potatoes are basically cut relying on manpower, which has very low automation degree and low efficiency, and is easily restricted by subjective factors. During cutting, different shapes of cutters are selected according to the sizes of the tuberous roots as desired, then the matched cutters are selected in sequence from large to small, and the tuberous roots with sizes as desired are obtained. For example, "-" shaped cutter is commonly existing for the seed potatoes of 51 to 70 g and "Y" shaped cutters for the seed potatoes of 71 to 100 g. In such a manner, it is necessary to prepare a variety of streamlined cutters for cutting the tuberous roots, so the cutting process is tedious, and the cutting efficiency is reduced. Moreover, most of cutting apparatuses perform an operation of blind cutting without concerning the number of bud eyes on the tuberous roots, so a large deviation lies in the number of the bud eyes on each of the tubers of the seed potatoes, and the volumes and sizes of the tubers are different, which is difficult to ensure the nutrient supply in a growing process of the cut pieces, is easy to cause the waste of the seed potatoes, reduces the cutting quality, and is difficult to ensure high yield of the tuberous root crop.

The inventor understands that mechanical cutting is mainly used in factories at present. Potatoes are put into a seed cutting machine, and the machine automatically cuts the potatoes as desired. At present, seed potato cutting machines on the market can be divided into two types: an intelligent control type and a scoop fixed cutter type. Throughout the machines used at present, there are general disadvantages of poor universality and easiness in careless omission. Due to limited ability of weight control and bud eye identification, the adaptability to the sizes of potato pieces and the cutting ability based on bud eye identification are still not ideal.

Zhao Xuanming et al. invented a seed potato cutting machine. The machine realizes a mechanized cutting to a certain extent, but it cannot control the weights of the potato pieces. No matter the seed potatoes are large or small, it can only ensure that the potato pieces have bud eyes, without determining the number and positions of the bud eyes.

Guo Zhidong et al. invented an automatic seed potato cutting machine. The machine realizes intelligent mechanized cutting to a certain extent, and controls the weights of potato pieces. However, a seed potato can only be cut into two pieces no matter it is large or small, which cannot meet requirements of actual sowing. Furthermore, this type of seed cutting machine also does not have a bud eye identification function.

Liu Wenyue et al. invented an intelligent seed production apparatus and method based on multistage self-positioning screening and bud eye identification, which overcomes a blind cutting operation of the apparatus and realizes flexible self-positioning of the seed potatoes. However, the apparatus does not have a screening function. In addition, an identifying and cutting part of the machine cannot determine to cut through the volumes of the seed potatoes. In addition, it has neither a cutter disinfecting function nor a solid-liquid mixing function.

In conclusion, the existing potato cutting machines have the problems about potato piece mass control and cutting. However, there are also the disadvantages that the universality is not strong enough, and intelligent seed production based on multistage screening and limit cutting and bud eye identification cannot be performed.

SUMMARY

The objective of the present disclosure is to provide an intelligent seed production apparatus based on multistage screening and bud eye identification, which can integrate the functions of screening, feeding, bud eye identifying, cutting, material mixing, and the like, realizes the control of the mass and the shape of the seed potatoes to be processed, improves the utilization rate of the seed potatoes and the sowing quality of the cut pieces, and ensures the germination percentage.

One or more embodiments of the present disclosure provide an intelligent seed production apparatus based on multistage screening and bud eye identification. It includes a feeding module, which screens out seed potatoes with mass and shapes meeting requirements through a multistage screening and limiting mechanism; a pre-cutting module, which receives the seed potatoes discharged from the feeding module, and cut each seed potato into two halves along a symmetry plane where a major axis of the seed potato is positioned; a bud eye identifying and cutting module, which receives seed potato pieces discharged from the pre-cutting module, determines a weight of each seed potato piece, identifies bud eye distribution on a surface of the seed potato piece, and cuts the seed potato piece into a plurality of tubers as required, so that bud eyes are distributed on different tubers uniformly; and a material mixing module, which receives the tubers and complete mixing of the tubers with a mixing material.

One or more embodiments of the present disclosure provides a seed potato production method, using the intelligent seed production apparatus based on multistage screening and bud eye identification. The method includes the following steps:

positioning and ordering seed potatoes to be screened, and performing a mass screening to screen out special-shaped seed potatoes and elongated seed potatoes;

symmetrically cutting each seed potato along a symmetry plane where a major axis of the seed potato is positioned;

respectively collecting a number and position information of bud eyes on a surface of each of seed potato pieces obtained by cutting the seed potato into two halves, and a volume of the seed potato piece, and determining a number of cutting pieces and a cutter solution according to collected information;

cutting the seed potatoes according to a determined cutter solution; and fully mixing tubers obtained by the cutting, with the mixing material to realize disinfection and antiseptic treatment of the tubers.

Beneficial effects of one or more technical solutions above are provided as follows.

The functions of screening, feeding, bud eye identifying, cutting, material mixing, and the like are integrated, which realizes the control of the mass and shapes of the seed potatoes to be processed and strict disinfection, thereby improving the utilization rate of the seed potatoes and the sowing quality of the cut pieces, and ensuring the germination percentage.

The bud eye identifying and cutting module comprehensively considers the distribution of the number of bud eyes on the seed potato pieces and the weight of the seed potato pieces, so as to obtain a cutter solution of the seed potato pieces and perform cutting, which can ensure that each tuber meets a required weight, has a uniform distribution of bud eyes on the tubers, thereby ensuring the seed production quality of the seed potato pieces.

BRIEF DESCRIPTION OF THE DRAWINGS

The accompanying drawings, which constitute a part of the present application, are used to provide a further understanding of the present application, and the exemplary embodiments of the present application and the description thereof are used to explain the present application, but do not constitute limitations to the present application.

Figure 1A:
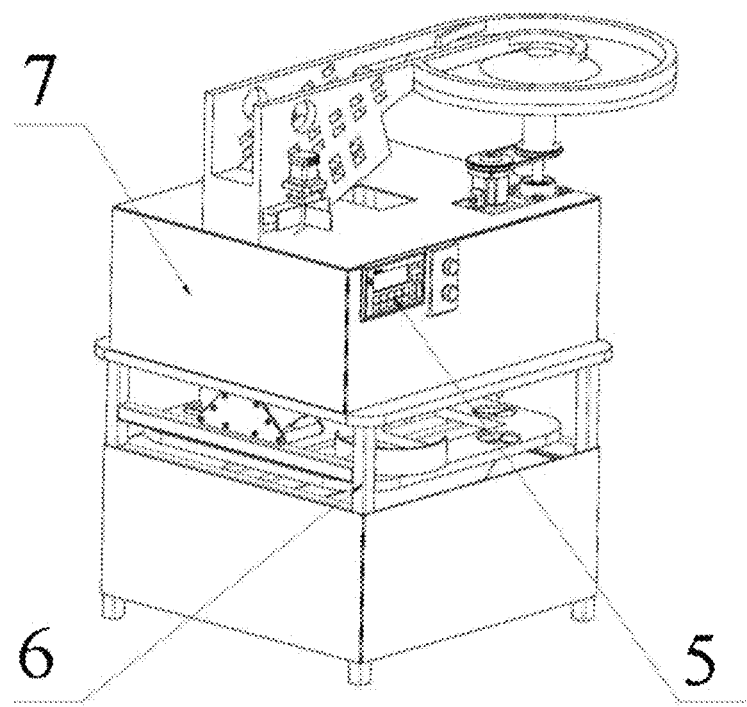
FIG. 1(a) is an axonometric schematic diagram of a whole mechanism with a housing in some embodiments of the present disclosure.
Figure 1B:
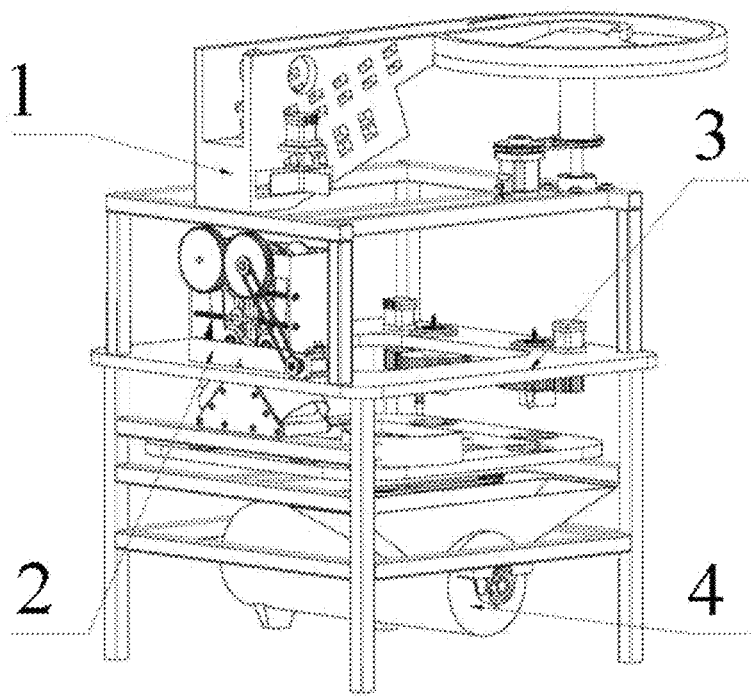
FIG. 1(b) is an axonometric view of the whole mechanism without the housing in some embodiments of the present disclosure.
Figure 1C:
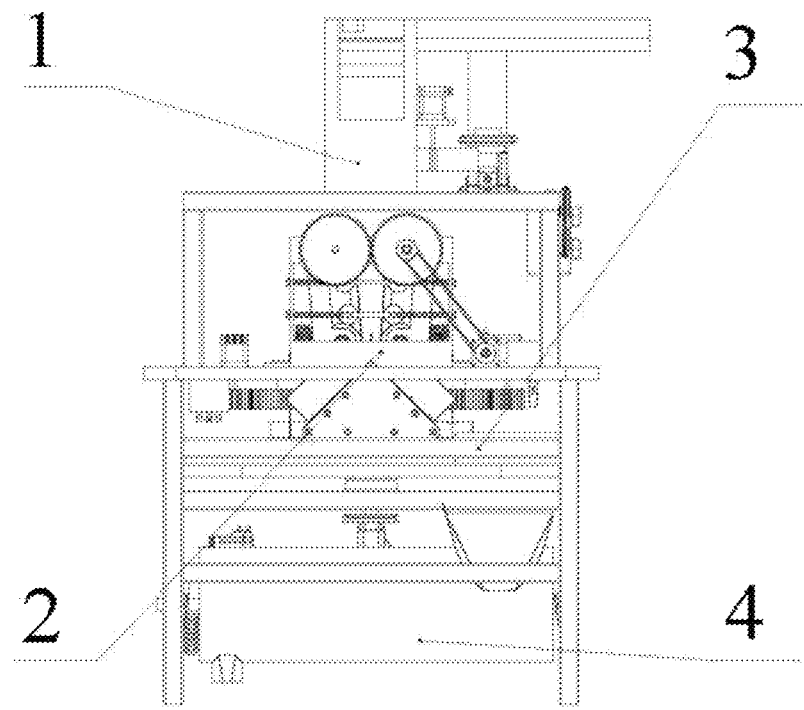
FIG. 1(c) is a front view of the whole mechanism without the housing in some embodiments of the present disclosure.
Figure 1D:
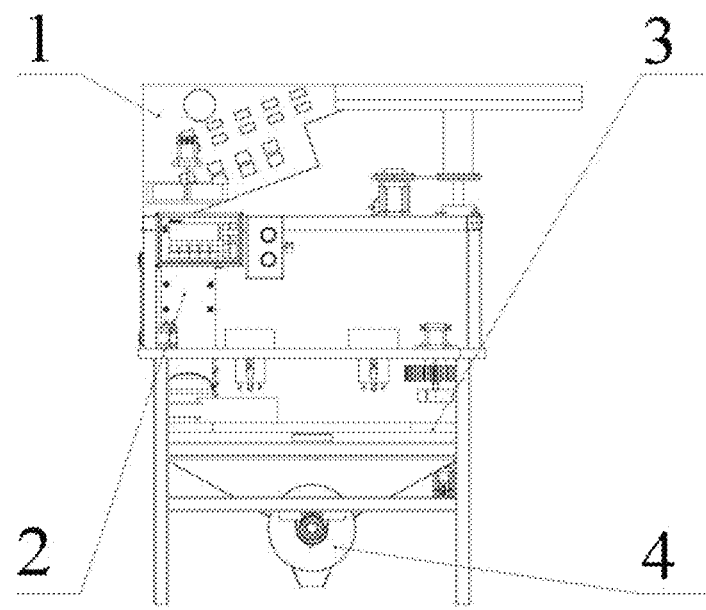
FIG. 1(d) is a side view of the whole mechanism without the housing in some embodiments of the present disclosure.
Figure 2A:
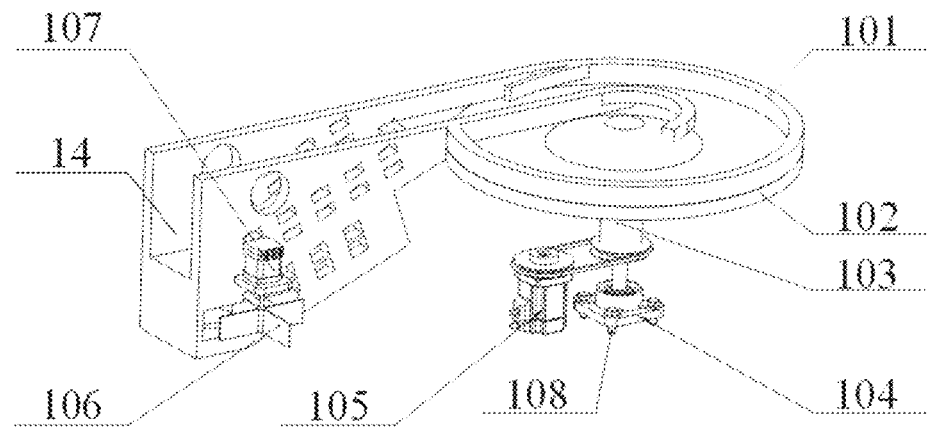
FIG. 2(a) is an axonometric view of a feeding module in some embodiments of the present disclosure.
Figure 2B:
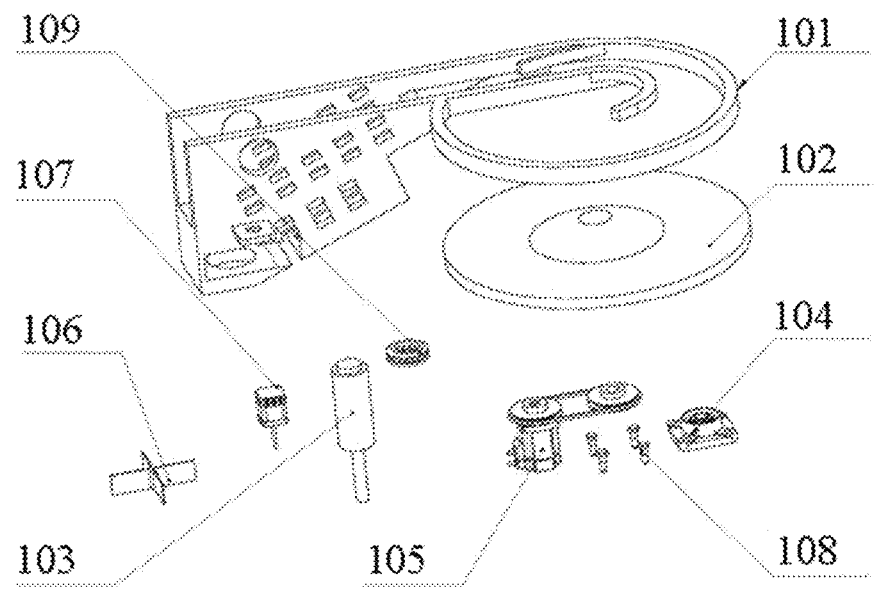
FIG. 2(b) is an exploded view of the feeding module in some embodiments of the present disclosure.
Figure 3A:
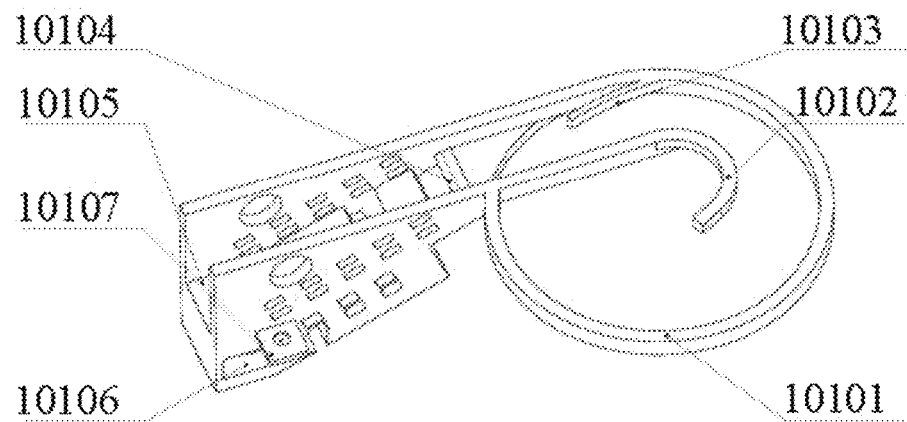
FIG. 3(a) is an axonometric view of a limiting railway in some embodiments of the present disclosure.
Figure 3B:
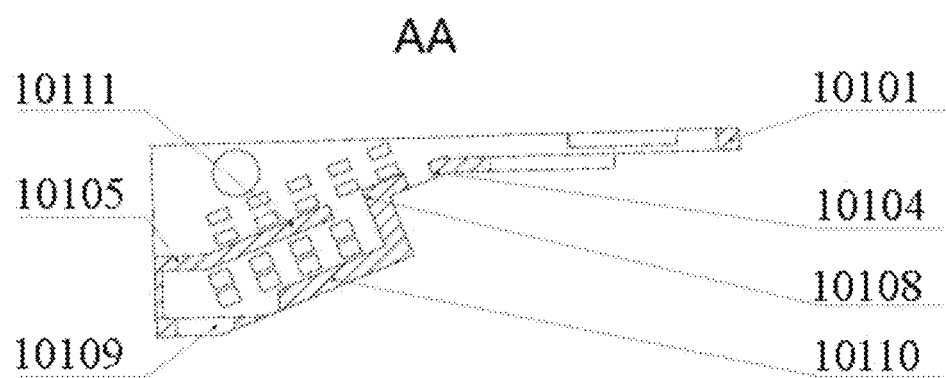
FIG. 3(b) is a sectional view of the limiting railway in some embodiments of the present disclosure.
Figure 4:
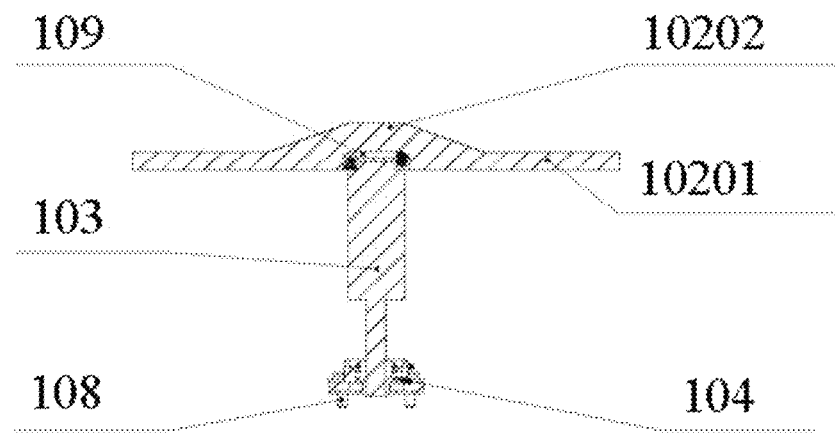
FIG. 4 is a partial sectional view of the feeding module in some embodiments of the present disclosure.
Figure 5A:
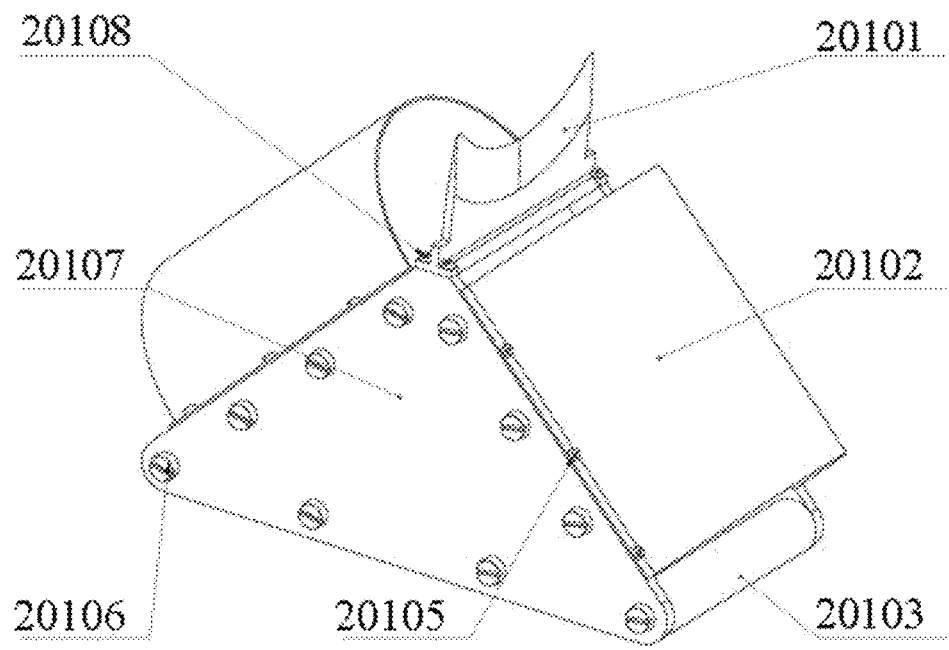
FIG. 5(a) is an axonometric view of a triangular separation mechanism in some embodiments of the present disclosure.
Figure 5B:
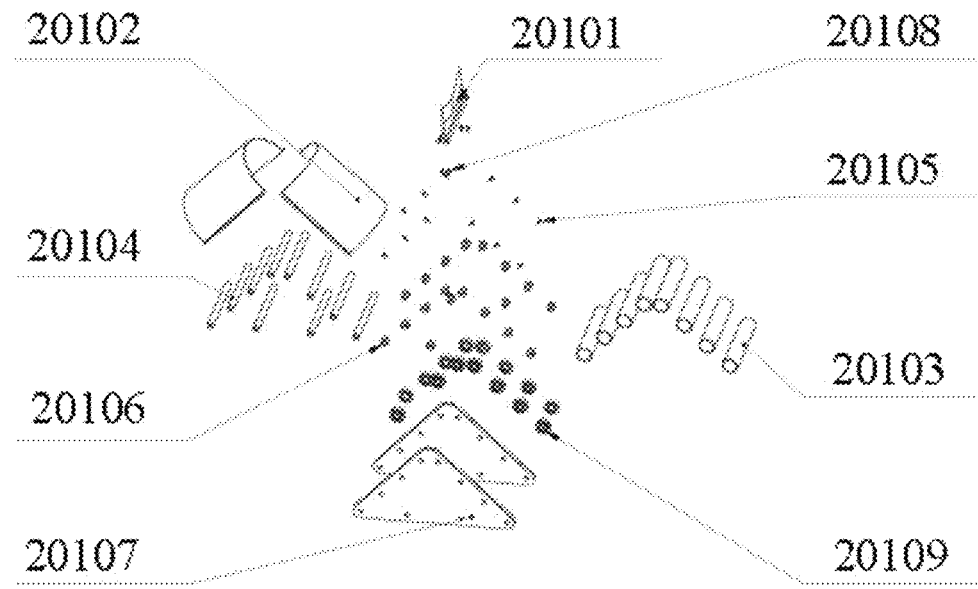
FIG. 5(b) is an exploded view of the triangular separation mechanism in some embodiments of the present disclosure.
Figure 5C:
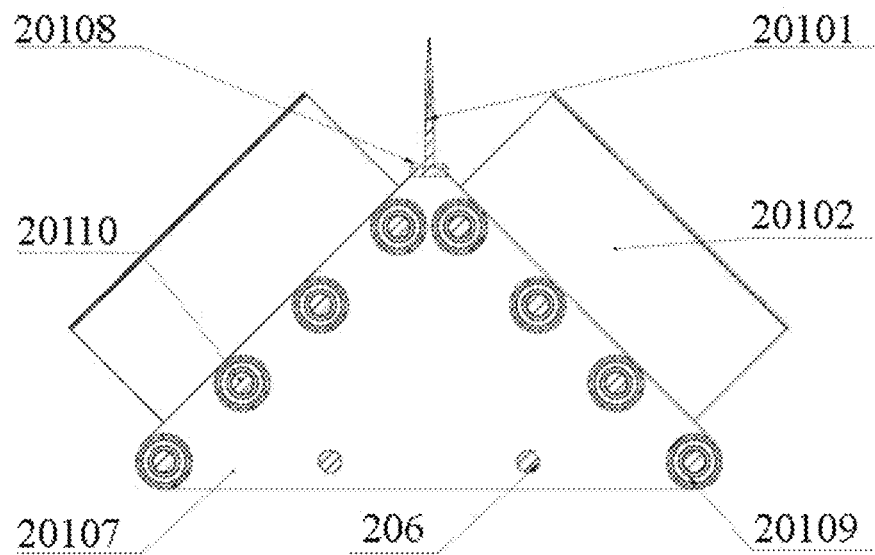
FIG. 5(c) is a sectional view of the triangular separation mechanism in some embodiments of the present disclosure.
Figure 6:
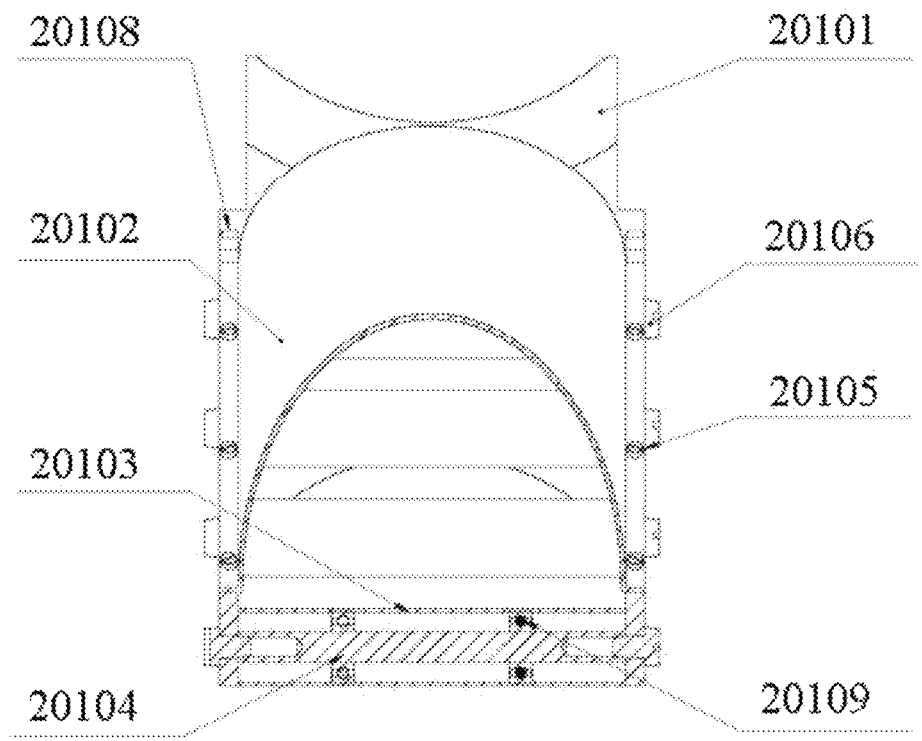
FIG. 6 is a partial sectional view of the triangular separation mechanism in some embodiments of the present disclosure.
Figure 7:
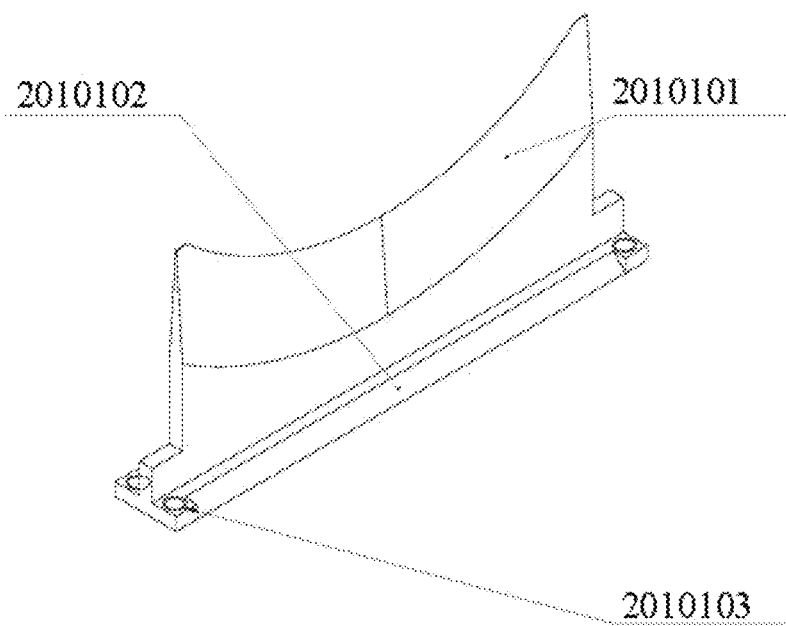
FIG. 7 is an axonometric view of an arc-shaped blade in some embodiments of the present disclosure.
Figure 8A:
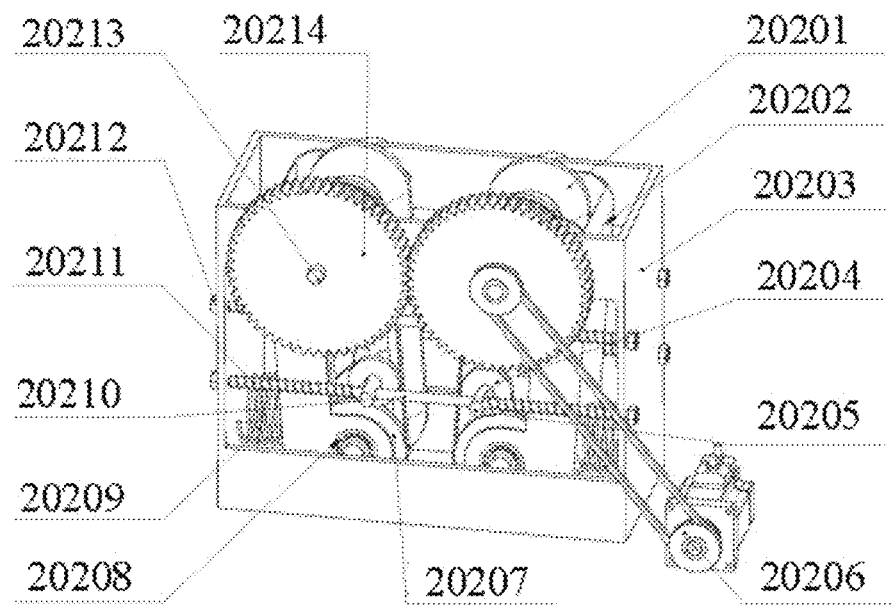
FIG. 8(a) is an axonometric view of a flexible conveying module in some embodiments of the present disclosure.
Figure 8B:
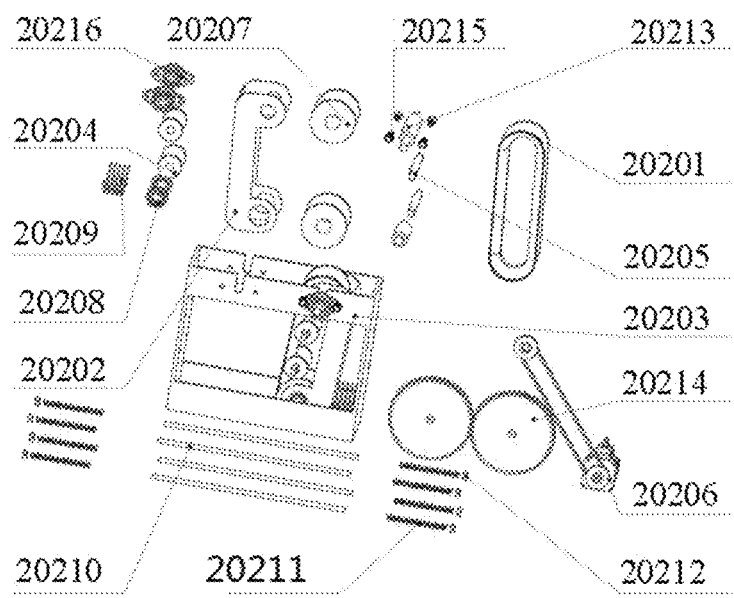
FIG. 8(b) is an exploded view of the flexible conveying module in some embodiments of the present disclosure.
Figure 8C:
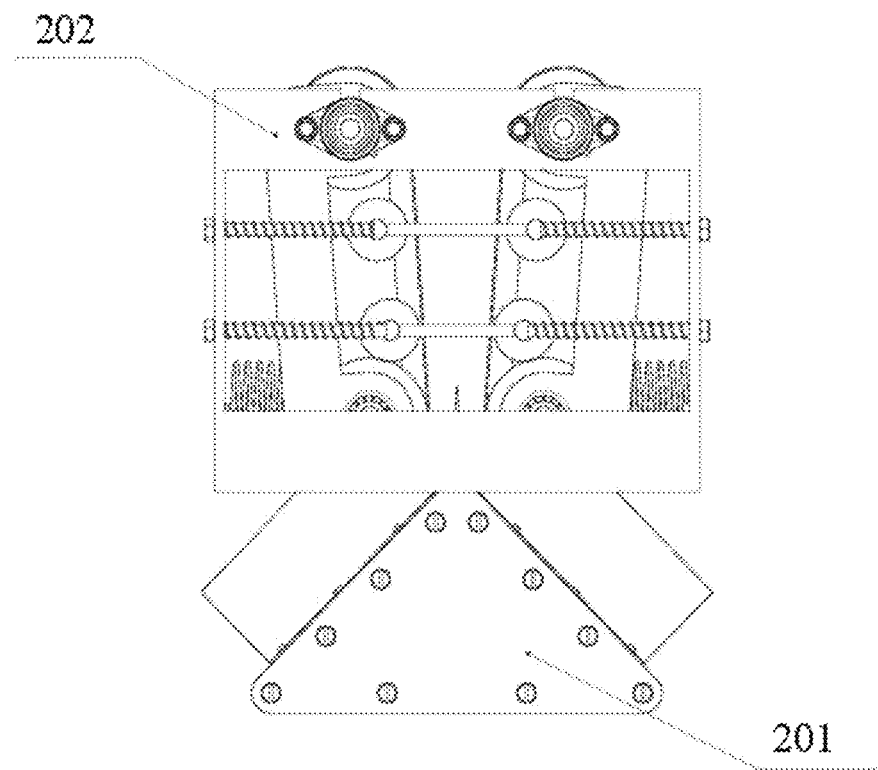
FIG. 8(c) is a front view of relative positions of the flexible conveying module and the triangular separation mechanism in some embodiments of the present disclosure.

List of reference numbers: 1 feeding module; 2 pre-cutting module; 3 bud eye identifying and cutting module; 4 material mixing module; 5 control system; 6 machine frame; 7 housing.

101 limiting railway; 10101 bearing disc outer baffle plate; 10102 bearing disc inner baffle plate; 10103 position and posture correcting baffle plate; 10104 first sorting opening; 10105 first sorting railway; 10106 second sorting railway; 10107 motor bearing plate; 10108 second sorting opening; 10109 limiting railway material falling opening; 10110 second inclined rail; 10111 first inclined rail; 102 conical bearing disc; bearing disc; 10202 conical material dividing bulge; 103 conical bearing disc transmission shaft; 104 conical bearing disc transmission shaft fixed bearing; 105 bearing disc power part; 106 limiting piece; 107 limiting stepping motor; 108 conical bearing disc transmission shaft fixing bolt; 109 feeding module conical bearing.

201 triangular separation mechanism; 20101 arc-shaped blade; 2010101 arc-shaped blade cutting edge; 2010102: arc-shaped blade base; 2010103 arc-shaped blade fixing hole; 20102 anti-turnover housing; 20103 bearing sleeve; 20104 bearing support rod; 20105 anti-turnover housing fixing screw; 20106 bearing support rod fixing screw; 20107 triangular body; 20108 arc-shaped blade fixing screw; 20109 self-sliding separation bearing; 202 flexible conveying module; 20201 flexible conveyor belt; 20202 support body; 20203 frame body; 20204 small V-shaped roller; 20205 small V-shaped roller support shaft; 20206 flexible conveying module power part; 20207 large V-shaped roller; 20208: large V-shaped roller bearing; 20209 support body adaptive spring; 20210 small V-shaped roller support cross bar; 20211 small V-shaped roller adaptive spring; 20212 small V-shaped roller support cross bar fixing nut; 20213 large V-shaped roller support shaft; 20214: transmission gear; 20215: support body fixing bolt; 20216 support body fixing bearing.

301 bud eye identifying and cutting module fixing plate; 302: material bearing disc; 30201 material bearing disc circular groove; 30202 material bearing disc cross support frame; 30203 cutter groove; 30204 sponge; 303 identification assembly; 30301 identification assembly fixing seat; 30302 lamp bulb; 30303 infrared ranging part; 30304 Open MV camera; 304 cutter bank; 30401 cutter bank motor; 30402: cutter bank second gear; 30403 V-shaped cutter; 30404 cutter bank first gear; 30405: cutter bank conical bearing; 30406 cutter bank electromagnet fixing frame; 30407 triangular cutter bank first electromagnet; 30408 I-shaped cutter; 30409 triangular cutter bank second electromagnet; 305 spraying system; 30501 spraying system liquid tank; 30502 spraying system spray nozzle; 306 material bearing plate baffle plate; 307: material bearing disc power part; 308 material bearing disc conical bearing.

401 material mixing drum; 402 material mixing module motor; 403 material mixing module fixing bearing; 404 material mixing module belt pulley; 405 material mixing module belt; 406 auger conveyor; 40601 auger conveyor rotating shaft; 40602 auger conveyor fixing rod; 40603 auger conveyor blade.

DETAILED DESCRIPTION OF THE EMBODIMENTS

It is to be noted that the following detailed description is illustrative and is intended to provide a further description of the present application. All technical and scientific terms used herein have the same meaning as commonly understood by those of ordinary skill in the art to which the present application belongs, unless otherwise indicated.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, apparatuses, assemblies and/or a combination thereof exist.

In a typical embodiment of the present disclosure, as shown in FIG. 1(a) to FIG. 1(d), an intelligent seed production apparatus based on multistage screening and bud eye identification is provided, including a feeding module 1, a pre-cutting module 2, a bud eye identifying and cutting module 3, and a material mixing module 4. The feeding module 1 can screen out seed potatoes with mass and shapes meeting the requirements through a multistage screening mechanism. The pre-cutting module 2 can receive the seed potatoes discharged from the feeding module 1, and cut each seed potato into two halves along a symmetry plane where a major axis is positioned. The bud eye identifying and cutting module 3 can receive the seed potato pieces discharged from the pre-cutting module 2 and determine the weight of the seed potatoes and identify the bud eye distribution on the surfaces of the seed potatoes. The bud eye identifying and cutting module 3 cut the seed potato pieces into multiple required tubers, and make bud eyes distributed on different tubers uniformly. The material mixing module 4 can receive the cut tubers, and complete the material mixing of the tubers. Each module is described as follows.

Feeding module 1: the feeding module 1 includes a bearing disc 10201 that can rotate along its own central axis. The central axis of the bearing disc 10201 is vertically arranged. The bearing disc 10201 bears seed potatoes to be screened. A multistage screening and limiting mechanism is mounted on the upper surface of the bearing disc 10201. The multistage screening and limiting mechanism includes a limiting railway 101. The limiting railway 101 can receive the seed potatoes in the bearing disc 10201, and convey the seed potatoes in a predetermined direction. The limiting railway 101 can output the seed potatoes less than a minimum mass, the seed potatoes greater than a maximum mass, the seed potatoes with the shapes not meeting the requirement, and the seed potatoes between the minimum mass and the maximum mass from different openings. A first sorting opening 10104 for screening out the seed potatoes less than the minimum mass, and a second sorting opening 10108 for screening out the seed potatoes between the minimum mass and the maximum mass are arranged at the limiting railway 101 in sequence. The seed potatoes greater than the maximum mass and the seed potatoes with the shapes not meeting the requirement are discharged from the tail end of the limiting railway 101.

Specifically, as shown in FIG. 2(a) to FIG. 4, the feeding module 1 includes a conical bearing plate 102, a first sorting railway 10105, and a second sorting railway 10106. A conical material dividing bulge 10202 is formed in the center of the conical bearing plate 102. A first sorting opening 10104, a second sorting opening 10108, and a position and posture correcting baffle plate 10103 are arranged on the first sorting railway 10105. A limiting railway blanking port 10109 and limiting pieces 106 are arranged on the second sorting railway 10106 on the lower layer.

The feeding module 1 is designed as a two-layer structure. The conical bearing plate 102 and the first sorting railway 10105 are a first layer structure, and the second sorting railway 10106 is a second layer structure. The bottom surface of the conical bearing plate 102 is divided into two parts, that is, a bearing disc 10201 and a conical material dividing bulge 10202. The conical material dividing bulge 10202 realizes the dispersion of the seed potatoes in the bearing disc 10201. A bearing disc power part 105 provides power for the conical bearing plate 102. The bottom surface of the conical bearing plate 102 rotate at a constant velocity around a conical bearing disc transmission shaft 103 to drive the seed potatoes to enter a first inclined rail 10111 and then slide into the first sorting railway 10105.

In order to meet the design requirement of rotating the conical bearing plate 102, the system does not control the velocity very strictly, and the function can be realized by using belt pulley transmission, gear transmission, and chain sprocket transmission.

The packaged seed potatoes to be processed are dispersed neatly by the feeding module 1 by using a V shaped positioning principle. The seed potatoes are fed and pushed by virtue of the friction force between the seed potatoes and the continuously rotating material bearing disc, so as to push the seed potatoes to enter the limiting railway and realize the ordering of the seed potatoes. After entering the first sorting railway 10105, the positions and postures of the seed potatoes are corrected by a position and posture correcting baffle plate 10103, so as to convey the seed potatoes along the long diameter of the seed potatoes. The sizes are screened by using the first sorting opening 10104, so that too small seed potatoes directly enter a subsequent material mixing process through the first sorting opening 10104 through the size limitation of the opening. Other seed potatoes are then subjected to shape screening through the second sorting opening 10108. Elongated seed potatoes and special-shaped seed potatoes cannot fall into the second sorting opening 10108, and the other seed potatoes enter a second inclined rail 10110 through the second sorting opening 10108. Then, the limiting pieces 106 are driven to push the seed potatoes to be fed into a limiting railway material falling opening 10109 one by one from the second sorting railway 10106, by a limiting stepping motor 107 fixed to the motor bearing plate 10107. The seed potatoes are quantitatively fed into the pre-cutting module 2 through the material falling opening, so as to realize the shape and volume screening of the seed potatoes and ordered periodic conveying. The screening greatly improves the survival rate of seed tubers.

Equal-interval periodic conveying: the stepping motor rotates at a constant rotating velocity. The space between two adjacently arranged limiting pieces can only accommodate one seed potato. One-way equal-period movement of the limiting pieces is realized through the cooperation of a ratchet wheel, a limiting pawl, and a cam. The periodic rotating velocity of the limiting pieces is controlled to adjust the conveying time of a single seed potato, so as to realize ordered one-way feeding of the seed potatoes.

The velocity of the seed potatoes produced due to the inclined rail is slightly less than the rotating velocity of the limiting pieces, which can ensure that the seed potatoes reach the optimal limit positions smoothly, and the positioned seed potatoes can enter the pre-cutting module 2. Small seed potatoes that fall from the second sorting opening are directly subjected to subsequent material mixing process without further cutting treatment.

In order to meet the transmission solution design of the system, the conical bearing disc transmission shaft 103 and a conical bearing disc transmission shaft fixed bearing 104 are used, and the conical bearing disc transmission shaft fixed bearing 104 is mounted on a frame body by using conical bearing disc transmission shaft fixing bolts 108; the conical bearing disc 102 is mounted on the frame body by using the conical bearing 109 of the feeding module 1.

Pre-cutting module 2: the pre-cutting module 2 includes two flexible conveyor belts 20201 that are arranged side by side. A V-shaped clamping space is formed between the two flexible conveying belts 20201. An upper opening of the V-shaped clamping space can receive the seed potatoes with the mass and shape meeting the requirements screened out from the feeding module 1, and convey the seed potatoes downward. A lower opening of the V-shaped clamping space is provided with a pre-cutting assembly. The pre-cutting assembly can cut the seed potatoes output from the V-shaped clamping space into two halves along the symmetry plane where major axes are positioned. The pre-cutting assembly includes a triangular body 20107. An arc-shaped blade 20101 is arranged at an upper sharp corner of the triangular body 20107. The arc-shaped blade 20101 directly faces the lower opening of the V-shaped clamping space.

Specifically, as shown in FIG. 5(a) to FIG. 8(c), the pre-cutting module 2 includes a triangular separation mechanism 201 and a flexible conveying module 202.

The flexible conveying module 202 adaptively positions the seed potatoes in space to drive the seed potatoes to convey along their major axes to collide with the arc-shaped blade 20101, so that seed potatoes are cut symmetrically, and then the seed potatoes that each are cut into halves are respectively conveyed to the next station. There are four pairs of V-shaped rollers. The topmost pair of large V-shaped rollers 20207 is connected to a transmission system to realize a transmission function. The bottommost pair of large V-shaped rollers 20207 is fixed to the lower part of a support body 20202 through a large V-shaped roller support shaft 20213 by virtue of a large V-shaped roller bearing 20208. These two pairs of large V-shaped rollers 20207 cooperate to support the flexible conveyor belts 20201. The flexible conveyor belts 20201 are pulled open by the large V-shaped rollers 20207. The two elastic surfaces of the flexible conveyor belts 2-0201 form a V-shaped clamping space due to the surface shapes of the large V-shaped rollers 20207, and the seed potatoes are positioned by using a V shape positioning principle.

The middle two pairs of small V-shaped rollers 20204 are strung on two pairs of small V-shaped roller support shafts 20205. The small V-shaped rollers 20204 and the small V-shaped roller support shafts 20205 are concentric and can rotation relatively. These two pairs of small V-shaped roller support shafts 20205 are respectively sleeved on two pairs of small V-shaped roller support cross bars 20210, and are connected by small V-shaped roller adaptive springs 20211. The small V-shaped roller adaptive springs 20211 and the small V-shaped roller support cross bars 20210 are concentric, and the small V-shaped roller support shafts 20205 are perpendicular to the small V-shaped roller support cross bars 20210. Due to the functions of the small V-shaped roller support cross bars 20210 and the small V-shaped roller adaptive springs 20211, the axes of the small V-shaped roller support shafts 20205 can move elastically in the axis directions of the small V-shaped roller support cross bars 20210, that is, the axes of the V-shaped rollers can move elastically in the axis directions of guide rods, and meanwhile, the small V-shaped rollers 20204 can rotate freely on the small V-shaped roller support shafts 20205. One end of each support body adaptive spring 20209 is connected to the lower end of the support body 20202, and the other end of each support body adaptive spring 20209 is connected to the frame body 20203, so that the whole V-shaped clamping space has an elastic adjustment function to adapt to the seed potatoes with relatively large volumes. The arc-shaped blade 2-0101 is horizontally arranged at the bottommost end of the flexible conveyor belt 20201. The arc-shaped blade 20101 includes an arc-shaped blade cutting edge 2010101 and an arc-shaped blade base 2010102, arc-shaped blade fixing holes 2010103, and an arc-shaped blade 20101. The arc-shaped blade 20101 is fixed to the triangular body 20107 through arc-shaped blade fixing screws 20108, and is at the same height as the bottommost pair of large V-shaped rollers 20207. The triangular separation mechanism 201 includes triangular bodies 20107, bearing sleeves 20103, and anti-turnover housings 20102. Four pairs of the bearing sleeves 20103 are symmetrically mounted on the triangular bodes 20107 to receive the seed potatoes that are cut into halves, and convey the seed potatoes that are cut into halves to a bud eye identifying and cutting module 3. The anti-turnover housings 20102 are fixed to the triangular bodies 20107 through anti-turnover housing fixing screws 2-0105, and are positioned obliquely above the bearing sleeves 20103, so as to prevent the seed potatoes from overturning in a process of conveying by the conveyor belts.

In a transmission process, the system requires that the flexible conveyor belts 20201 and the conveyor belts in the triangular separation mechanism 201 on two sides to rotate oppositely, so as to use a gear transmission function. There is not strict requirement on velocity for energy input of the system, so the power output by a motor can be input into the system by using belt pulley transmission, chain sprocket transmission, and gear transmission.

A flexible conveying module power part 20206 outputs power to transmission gears 20214. The transmission gears 20214 rotate to drive the flexible conveyor belts 20201 to rotate. The support body 20202 is fixed to the frame body 20203 by support body fixing bolts 20215 and support body fixing bearings 20216; the flexible conveyor belts 20201 are supported by the large V-shaped rollers 20207. The small V-shaped roller support cross bars 20210 are fixed to the frame body 20203 by small V-shaped roller support cross bar fixing nuts 20212. The triangular bodies 20107 are assembled by bearing support rod fixing screws 20106. The anti-turnover housings 20102 are fixed to the triangular bodes 20107 by the anti-turnover housing fixing screws 20105. The bearing sleeves 20103 are supported by two self-sliding separation bearings 20109 and bearing support rods 20104.

Bud eye identifying and cutting module 3: the bud eye identifying and cutting module 3 includes a material bearing disc 302. The material bearing disc 302 is provided with four pairs of material bearing disc circular grooves 30201. There are two material bearing disc circular grooves 30201 in each pair of the material bearing disc circular grooves 30201. The material bearing disc 302 can rotate along the vertical axis, so that each pair of the material bearing disc circular grooves 30201 is switched among a material falling station, an identification station, a cutting station, and a disinfection station. The material bearing disc circular grooves 30201 at the material falling station can receive the seed potato pieces discharged from the pre-cutting module 2. An identification assembly is arranged above the identification station. The identification assembly can identify the position distribution of the bud eyes on an external circular surface of the seed potato piece and the weight of the seed potato piece. The identification assembly can transmit information to a control system. The control system can output a cutting number and a cutter cutting solution instruction to the cutter assembly according to a preset program, and the seed potato pieces at the cutting station can be cut into required tubers by the cutter assembly.

The bud eye identifying and cutting module 3 includes a bud eye identifying and cutting module fixing plate 301 horizontally arranged. The bud eye identifying and cutting module fixing plate 301 is supported through a machine frame 6. An identification assembly 303 and a cutter module are arranged on the lower end surface of the bud eye identifying and cutting module fixing plate 301. The identification assembly 303 includes an Open MV bud eye identification part and an infrared ranging part 30303. The identification assembly 303 is positioned right above the identification station. Arc-shaped blades in different structural forms can extend out from a cutter bank 304 of the cutter module, and can be driven to rotate along their own vertical axes, so as to adapt to the instruction output from the control system.

Figure 9A:
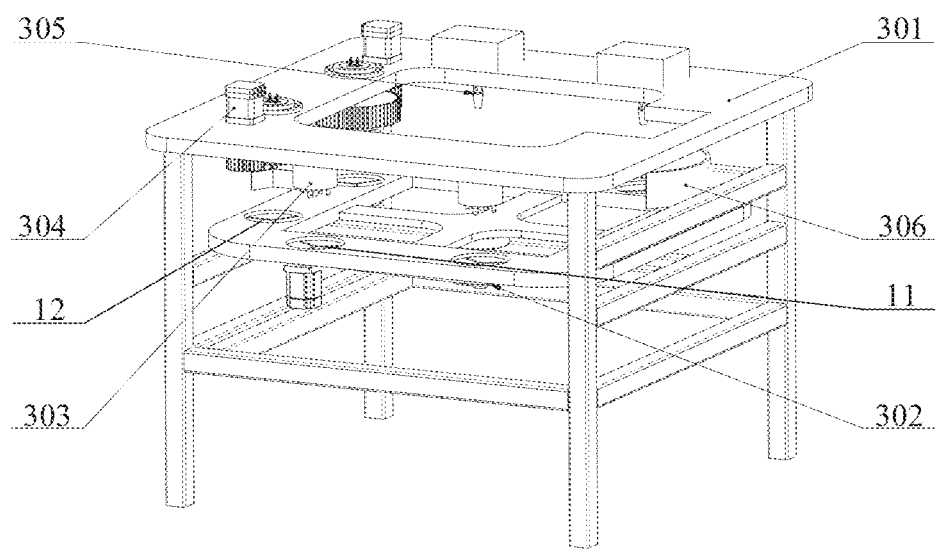
FIG. 9(a) is an axonometric view of a bud eye identifying and cutting module in some embodiments of the present disclosure.
Figure 9B:
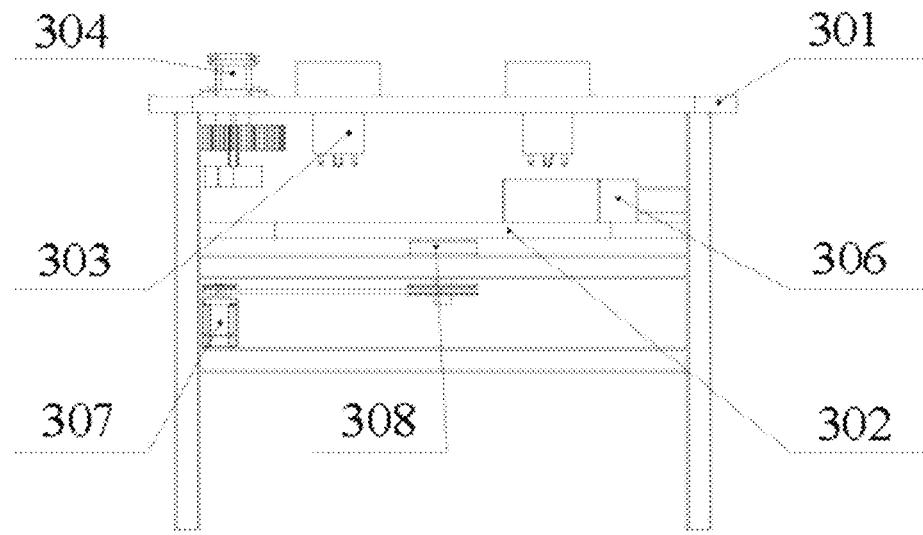
FIG. 9(b) is a side view of the bud eye identifying and cutting module in some embodiments of the present disclosure.
Figure 9C:
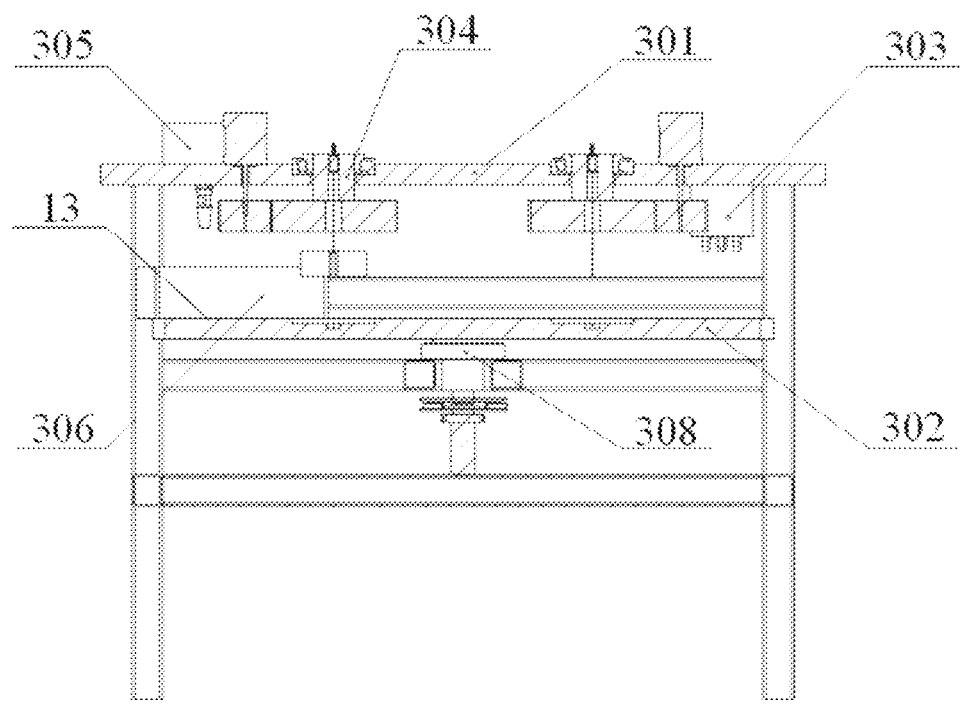
FIG. 9(c) is a sectional view of the bud eye identifying and cutting module in some embodiments of the present disclosure.
Figure 10:
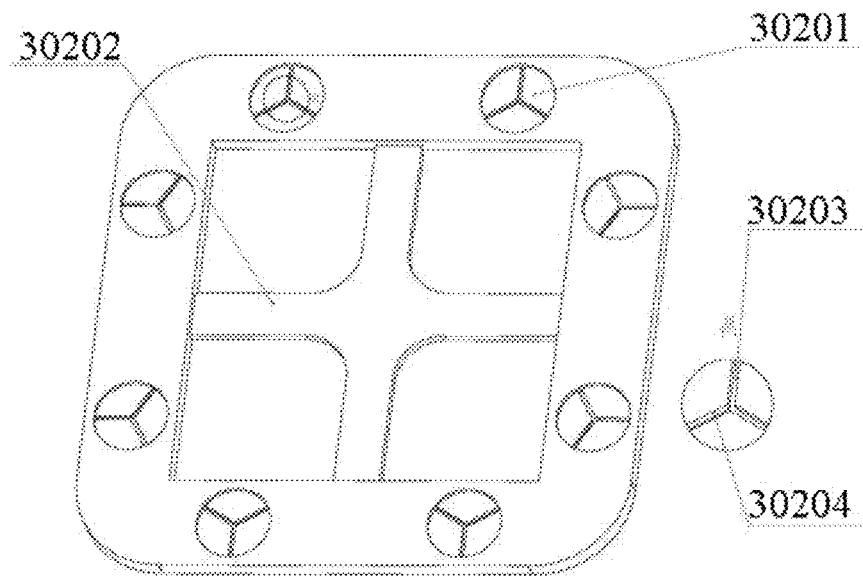
FIG. 10 is an axonometric and partially enlarged diagram of a material bearing disc in some embodiments of the present disclosure.
Figure 11:
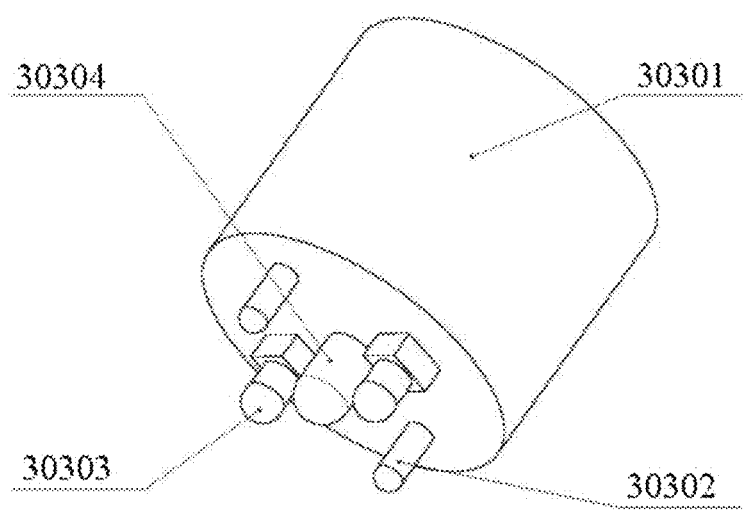
FIG. 11 is an axonometric view of an identification assembly in some embodiments of the present disclosure.
Figure 12:
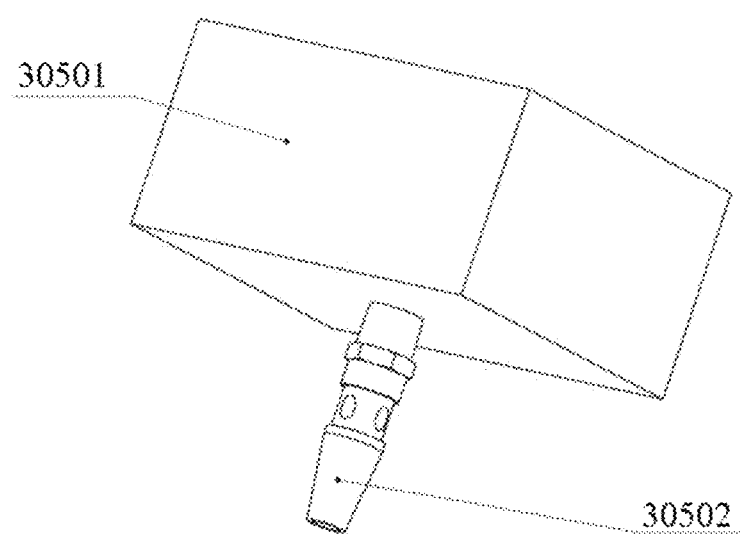
FIG. 12 is an axonometric view of a spraying system in some embodiments of the present disclosure.

Specifically, referring to FIG. 9(*a*) to FIG. 12, the bud eye identifying and cutting module 3 includes four processes, respectively, a feeding process, an identifying process, a cutting process, and a chemical spraying process. The whole system intermittently rotates to convey the seed potatoes relying on the material bearing disc 302. The identification assembly 303 includes the Open MV bud eye identification part and the infrared ranging part 30303. The Open MV bud eye identification part includes an Open MV camera 30304, an stm32 single chip microcomputer, and lamp bulbs 30302. The lamp bulbs 30302 provide light sources. The Open MV camera 30304 photographs the seed potatoes at the station, and collects the number of bud eyes and position information. The infrared ranging part 30303 measures the height of the seed potato after being cut into halves, and performs fuzzy computing to obtain the volume of the seed potato by integrating the seed potato projection area information acquired by the Open MV camera 30304.

The bud eye identifying and cutting module 3 receives the seed potatoes conveyed out from the pre-cutting module 2. In a feeding process, the seed potatoes are placed in the centers of the material bearing disc circular grooves 30201 by the triangular separation mechanism 201. At the Open MV bud eye intelligent identification station, the number of bud eyes and the bud eye positions on the surface of the seed potato and the seed potato mass are collected by the Open MV camera 30304 and the infrared ranging part 30303. At the cutting station, the seed potato is cut by using the cutter bank 304 and the background algorithm instruction. A material bearing plate baffle plate 306 is arranged in the chemical spraying process to strip the cut seed potatoes into a subsequent material mixing process. Both the identification assembly 303 and the cutter bank 304 are fixed to the bud eye identifying and cutting module fixing plate 301.

The bud eye identifying and cutting module 3 includes the material bearing disc 302, an identification component fixing seat 30301, the identification assembly 303, a cutting algorithm database, the cutter bank 304, and a cutter bank motor 30401.

The identification assembly 303 includes an identification component fixing seat 30301, the Open MV camera 30304, lamp bulbs 30302, and infrared ranging parts 30303. The two lamp bulbs 30302 and the two infrared ranging parts 30303 are distributed on the periphery of the Open MV camera 30304 to provide excellent lighting conditions for the Open MV camera 30304 to perform mass estimation.

The material bearing disc 302 is of square double-layer structure and rotate intermittently by the material bearing disc power part 307 connected with the material bearing disc 302 via the material bearing disc cross support frame 30202. Two double-layer material bearing disc circular grooves 30201 are distributed at the same position at each side of the material bearing disc 302. The upper layer is a cutter groove 30203, and the lower layer is sponge 30204 immersed with potassium permanganate or 75% alcohol, which can disinfect a cutter when the cutter is withdrawn each time. The material bearing disc 302 is fixed to the frame body 6 through material bearing disc conical bearings 308. The material bearing disc 302 is driven to operate intermittently by the material bearing disc power part 307.

The accuracy requirement of the system can only be met by using gear transmission, belt pulley transmission, and synchronous belt transmission due to strict requirement on the time and displacement of intermittent movement of the material bearing disc 302 in the system. The power input for an electromagnet of the system is realized by a 24V alternating-current motor. The electromagnet used by the cutter bank 304 in the system can also be realized by an electric pushing rod. However, considering the problems about the effect, space arrangement, and work efficiency of cutting, the space occupancy rate of the electric pushing rod is high, and the movement velocity is slow relative to the electromagnet, so the solution adopts an electromagnet design to complete cutting.

Figure 13A:
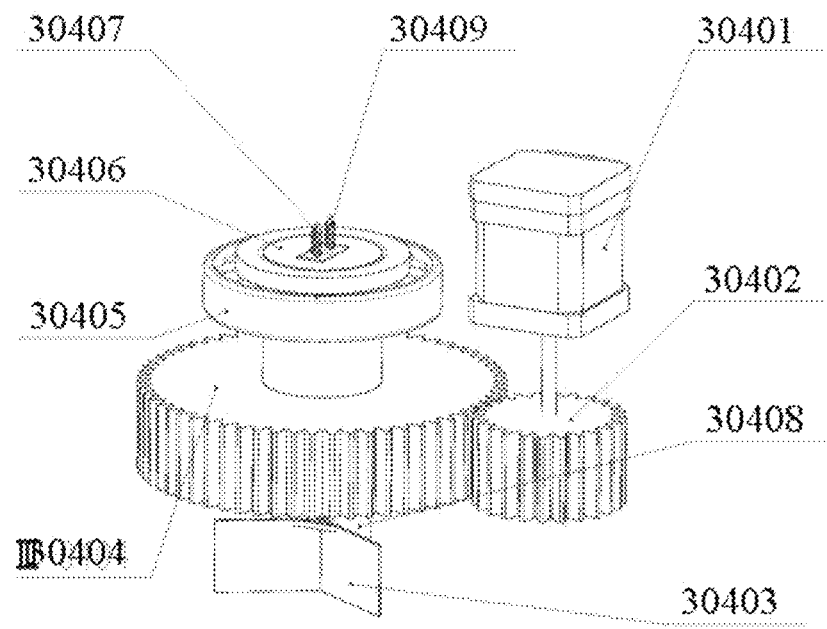
FIG. 13(a) is an axonometric view of a triangular cutter bank in some embodiments of the present disclosure.
Figure 13B:
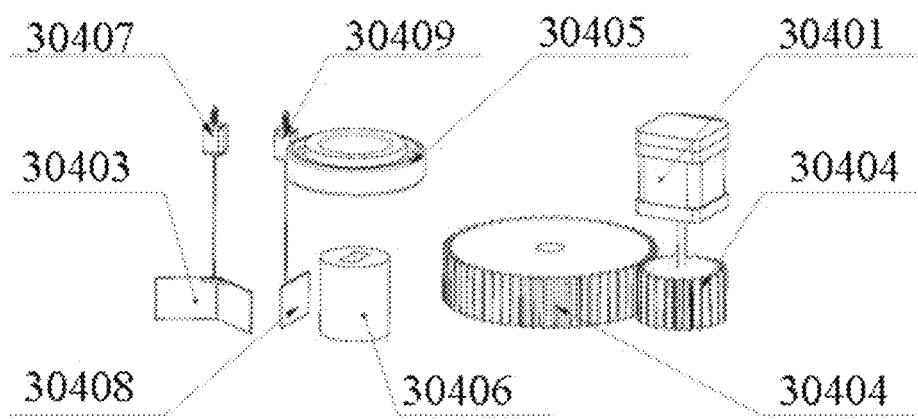
FIG. 13(b) is an exploded view of the triangular cutter bank in some embodiments of the present disclosure.
Figure 13C:
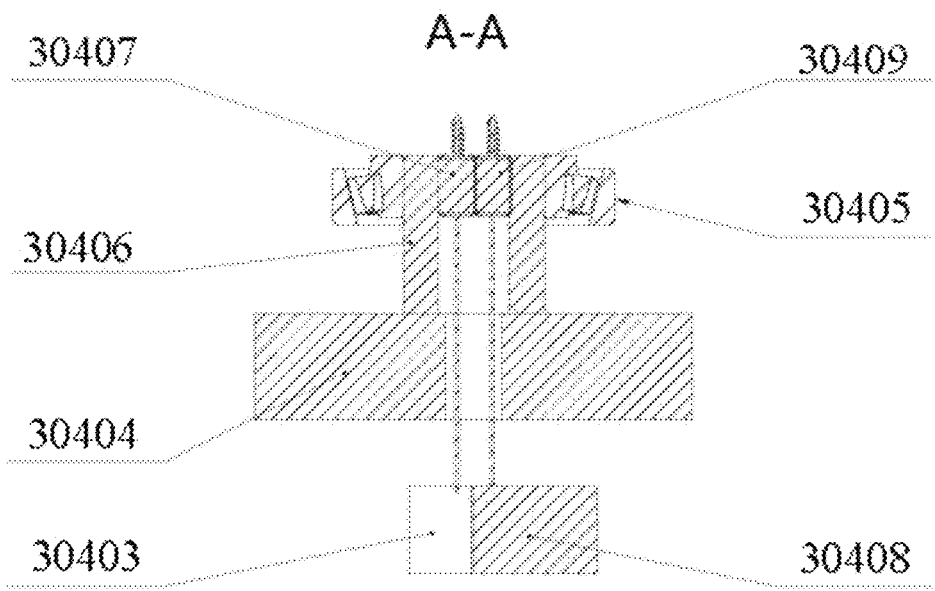
FIG. 13(c) is a partial sectional view of the triangular cutter bank in some embodiments of the present disclosure.

The cutter bank 304, as shown in FIG. 13(*a*) to FIG. 13(*c*), includes a power part and a cutter part. The power part includes a cutter bank motor 30401, a cutter bank first gear 30404, and a cutter bank second gear 30402, so that the cutter bank 304 can rotate. The cutter part includes a V-shaped cutter 30403, a cutter bank conical bearing 30405, a cutter bank electromagnet fixing frame 30406, a triangular cutter bank first electromagnet 30407, an I-shaped cutter 30408, and a triangular cutter bank second electromagnet 30409, which realize the cutting of potatoes.

The cutter includes an I-shaped cutter 30408 and a V-shaped cutter 30403, which are respectively controlled by the triangular cutter bank second electromagnet 30409 and the triangular cutter bank first electromagnet 30407. Both the triangular cutter bank second electromagnet 30409 and the triangular cutter bank first electromagnet 30407 are direct-push electromagnets. The two electromagnets are embedded into the cutter bank electromagnet fixing frame 30406, and mounting holes are reserved in the end of the fixing frame 30406, so as to facilitate mounting. The cutter bank electromagnet fixing frame 30406 is fixed to the inner side of the cutter bank conical bearing 30405. The above-mentioned parts form the cutter part. A relay receives an instruction sent by the algorithm database to control the stepping motor to start or stop, so as to control the cutter bank first gear 30404 to drive the cutter part to rotate, thereby rotating the I-shaped cutter 30408 and the V-shaped cutter 30403 to the optimal cutting positions. The algorithm database further sends out an instruction to control the corresponding triangular cutter bank second electromagnet 30409 and the triangular cutter bank first electromagnet 30407 to power on, and then control the V-shaped cutter 30403 or the I-shaped cutter 30408 to move downwards quickly, so that the seed potato is separated by cutting. The cutter bank 304 is arranged right above the cutting station, and is fixed to the frame body 6.

The algorithm database analyzes the bud eye information, divides a picture into cutting areas. The boundary of each cutting area is a cutter cutting position. Each position corresponds to one electromagnet. One electromagnet corresponds to one relay. The database selects the corresponding relay to work according to the divided areas, and then controls a solenoid valve to power on; the electromagnet withdraws the cutter to cut. When the cutter is withdrawn, the cutter is in contact with the sponge 3-0204 for disinfecting through the cutter groove 30203. The relay receives the instruction sent by the algorithm database to control the stepping motor to start or stop, and then control the gear to rotate to drive the electromagnet to rotate, so that the cutter is rotated to the optimal cutter cutting position, thereby avoiding cutting right on a bud eye.

All factors are considered when the cutting algorithm database processes the bud eye information, so as to ensure that at least two bud eyes are maintained on each cut piece. Meanwhile, the sizes of the cut pieces are within a certain range to ensure that the mass of the cut pieces is controlled to be 30 to 50 g, which ensures the germination percentage and nutrient supply in a growth process.

An algorithm program is built-in the cutting algorithm database to process and analyze the acquired bud eye information. The volume of the seed potato that is cut into halves is measured by a pixel number method by using powerful Python library based on an Open MV machine vision processing technology of Stm32F7 in image identification, and bud eyes on the surface of the seed potato are found in the picture by using features through the methods related with color identification and feature point monitoring. The number and position of the bud eyes on the surface of the seed potato are collected to form an image. An X-Y coordinate system is established based on the image; required color and position coordinate (x, y) of the feature point are returned in the coordinate system; the position information is sent to an Stm32F1 master control to analyze and process the information; the image is divided into three areas according to the position of the cutter. The area where a bud eye is positioned is determined according to the returned position coordinate (x, y), and the mass of the seed potato is estimated in combination with the height of the seed potato detected by the infrared ranging part. Comprehensively considering the nutrient content and the number of bud eye needed for the growth of the cut piece, whether to merge the areas is determined with the help of a program algorithm, so as to plan out an optimal cutting manner, that is, the boundary of an effective area is the cutting position of the streamlined cutter, and the required electromagnet is automatically controlled to act to cut the seed potato.

A specific process for obtaining the volume of the seed potato: the cut seed potato that has one half of one seed potato is similar to a semi ellipsoid, pixels (respectively A/2, B/2) occupied by a major semi axis and a minor semi axis of the ellipsoid can be measured through Open MV. It is easy to know that the scale K of the occupied pixels to the actual length is a fixed value, that is, the length of the actual major semi axis is $a=K \cdot A/2$, and the length of the minor semi axis is $b=K \cdot B/2$. The distance L from the infrared module to the highest point of the seed potato can be measured through the infrared ranging module, and the distance from an infrared sensor to a baseplate is a fixed value d, so that the polar radius of the semi ellipsoid can be calculated as $c=d-L$. According to an ellipsoid volume formula $V=4/3\pi abc$, since the seed potato has been cut in half, then the final volume is $V'=2/3\pi abc$, and various parameters are substituted to obtain $V'=1/6\pi \cdot K^2 \cdot A \cdot B(d-L)$. The mass of the seed potato is $m=V'\rho$ ($\rho$ is the density of the seed potato). After the mass is obtained, whether to cut and how many pieces needing to cut are determined according to the range of the mass. The position relationship of various coordinates is determined through the coordinates of the bud eyes. 0, 1 instruction is issued to the corresponding relay that has been encoded. When the high level is 1, the relay is triggered from a normally open state to a normally closed state. Meanwhile, an OLED displays the coordinates of the bud eye. A method for determining the corresponding relay to issue the instruction is that: if the mass of the seed potato is less than 50 g, then the seed potato is not cut; if the mass of the seed potato is between 50.5 g and 75 g, then the seed potato is cut once (cut by the V-shaped cutter); if the mass of the seed potato is greater than 75 g, then the seed potato is cut twice (cut by the V-shaped cutter and the I-shaped cutter together). A bud eye is identified through Open MV. The bud eye coordinates are sent to a single chip microcomputer through a serial port. The single chip microcomputer determines whether the bud eye is beside the cutter. If the bud eye is beside the cutter, then the single chip microcomputer controls the motor to rotate, and the motor drives the cutter to rotate to a position that is not overlapped with the bud eye. A material mixing module 4: the material mixing module 4 includes an auger conveyor. The auger conveyor can convey tubers obliquely upwards. The opening at the lower end of the auger conveyor can receive the tubers output from the bud eye identifying and cutting module 3. The auger conveyor includes a housing. A mixing material is arranged in the inner cavity of the housing. Spiral blades are mounted on a rotating shaft of the auger conveyor. The spiral blades are of a hollow structure.

Figure 14:
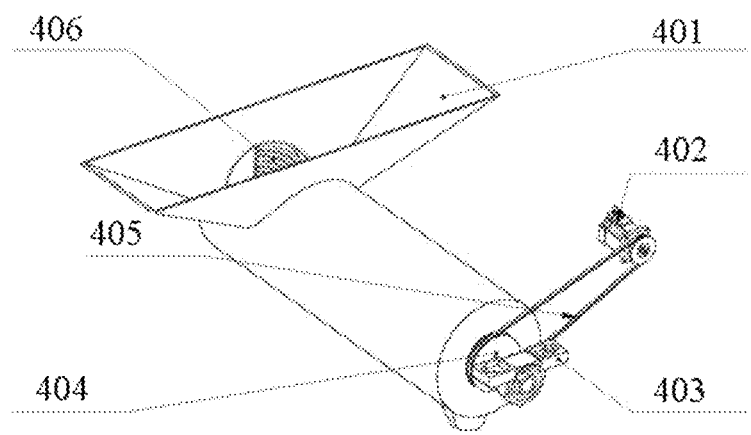
FIG. 14 is an axonometric view of a material mixing module in some embodiments of the present disclosure.
Figure 15:
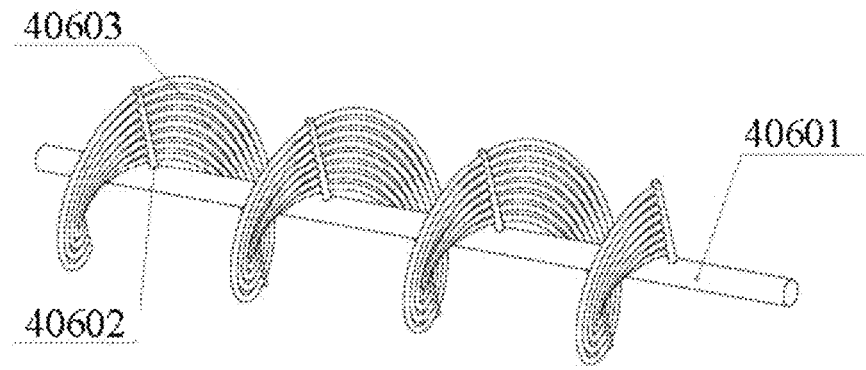
FIG. 15 is an axonometric view of a partial structure of an auger conveyor in some embodiments of the present disclosure.

Specifically, referring to FIG. 14 to FIG. 15, the material mixing module 4 includes a motor 402 of the material mixing module 4 a fixed bearing 303 of the material mixing module 4, a belt pulley 404 of the material mixing module 4, a belt 405 of the material mixing module 4, and an auger conveyor 406. An auger conveyor rotating shaft 40601, auger conveyor blades 40603, and a material mixing drum 401 are mounted concentrically. The auger conveyor blade 40603 is formed by circling several thin steel bars by taking an auger conveyor fixing rod 40602 as a support, and forms a hollow structure. The inlet of the whole system is low, and the outlet of the whole system is high. The material mixing drum 401 is filled with plant ash. A large amount of plant ash is centralized at the inlet due to a height difference. When working, the cut pieces enter the system from the inlet in the top of the material mixing drum. The auger conveyor blade 40603 is driven to rotate in the vertical direction along with the rotation of the auger conveyor rotating shaft 0601. A horizontal material mixing rod is driven to rotate horizontally through a transmission box, so that the mixing material and the cut pieces are fully mixed. The cut pieces are made to get close to the outlet slowly through the rotation of the auger conveyor blade 40603 after the cut pieces are mixed with the mixing materials, to realize disinfection and antiseptic treatment through the mixing materials. Excessive mixing materials leak back to the inlet through a hollow gap of the auger conveyor blade 40603 due to the height difference between the inlet and the outlet, which improves the utilization rate of the mixing materials, and reduces waste.

The system does not have high requirement on velocity and the like, the functions can be realized well by using the transmission modes, such as gear transmission and belt pulley transmission.

The antiseptic treatment and growth protection of the cut pieces are realized by fully mixing the cut pieces and the mixing materials by the material mixing module 4. The hollow structure of the auger conveyor blade 40603 can make excessive mixing materials flow back to the inlet of the system. The material mixing module 4 performs antisepsis and disinfection treatment on the cut pieces, and cooperates with the period spraying system in the bud eye identifying and cutting module 3, so as to automatically determine the start or stop of the material mixing module according to the production requirement, thereby improving the material mixing flexibility and the diversity of the material mixing module, and improving the quality of the cut pieces and the success rate of sowing.

The beneficial effects of the present embodiments are as follows.

1. The feeding module is designed with two module structures, which respectively realize the functions of dispersing, ordering and screening, positioning, and feeding, screen the seed potatoes strictly, and improve the seed production and germination percentage. The feeding of the seed potato is optimized, so as to provide convenience for subsequent work.

2. The flexible conveying module realizes adaptive position and posture correction in an upward direction for the seed potatoes falling therein by fully using the elasticity of springs and the V shape self-positioning principle, and the work of cutting in half is realized by cooperation of impact and the streamlined cutter.

3. The bud eye identifying and cutting module photographs an arc surface of the seed potato by using an Open MV camera, and collects the number and position of the bud eyes on the arc surface. The height of the seed potato is measured by the infrared ranging part. A fuzzy calculation result of the mass of the seed potato is fed back to the cutting algorithm database to analyze data, so as to plan out an optimal cutting mode. The cutting mode needs to ensure that at least two bud eyes are maintained on each cut piece. Furthermore, the size of the cut piece is required to be within a certain range to ensure that the mass of the cut piece is controlled to be 20 to 50 g, which ensures the germination percentage and nutrient supply in a growth process. An angular gear is controlled to deflect and the rotation of the cutter is properly adjusted according to the information of the bud eye position and the cutter position, so that the cutter bank cuts the seed potato according to the optimal cutting mode. The electromagnets act to make the corresponding cutters to cut simultaneously, so as to prevent a phenomenon of inconsistent cutting seams caused by cutting repeatedly. The cutter penetrates through a notch in the upper layer of a rotary turntable and is immersed in the potassium permanganate sponge at the bottom layer of the rotary turntable to realize single cutting disinfection. The period spraying apparatus starts or stops the spraying apparatus or replaces the chemical according to seed mixing requirements of different varieties of potatoes; seed tubers enter the drum after being subjected to the spraying treatment by the chemical.

4. The height of a feeding port of the drum of the material mixing module is low, and the height at the discharging port of the material mixing module is high. The drum adopts the hollow spiral auger. The drum is internally filled with a solid mixing material. The cut pieces are fully mixed with the mixing material by utilizing the rotation of the hollow auger conveyor. Furthermore, the excessive mixing material leaks back to the inlet through the gap of the auger conveyor blade due to the height difference between the inlet and the outlet, so that the mixing material is used repeatedly; along with the rotation of the hollow auger conveyor, the cut pieces are delivered out of the material mixing material module and are discharged for separate storage.

Working principle: when a user needs to produce seed potatoes, the prepared seed potatoes are poured into the feeding module 1. Most of the seed potatoes are in contact with the conical material dividing bulge 10202 on the conical bearing disc 102 first. The conical bearing disc 102 rotates to disperse the seed potatoes in all directions due to a centrifugal force and a taper, so as to feed the seed potatoes into the first sorting railway 10105. If the major axes of the seed potatoes are not tangent to the conical bearing disc 102 when the seed potatoes reach the bottom of the conical bearing disc 102, and then the seed potatoes rub against the conical surface of the conical bearing disc due to the rotation of the conical bearing disc 102 and the blocking of the bearing disc inner baffle plate 10102, so that the positions of the seed potatoes must be changed to the position where the major axis is tangent to the bearing disc 10201. The bearing disc 10201 rotates to drive the seed potatoes to go forward slowly in the first sorting railway 10105. The movement directions of a few seed potatoes may be parallel to the minor axes thereof, and will touch the bearing disc outer baffle plate 10101. The shapes and positions of the seed potatoes are corrected through a guide action of the baffle plate, so that the seed potatoes are delivered with the minor axes thereof perpendicular to the movement direction, thereby realizing ordered arrangement before entering the double-layer inclined rail. At the inlet of the first sorting railway 10105, preliminary screening is performed according to the medium diameter and short diameter of the seed potatoes. The seed potatoes with the medium diameter and short diameter less than a predetermined size of the first sorting opening 10104 are screened out, and are directly subjected to subsequent material mixing sequence, which greatly improves the seed production efficiency. Other seed potatoes satisfying the conditions continue sliding downward along an inclined surface. Then, elongated seed potatoes can cross the second sorting opening 10108 due to different positions of the gravity centers of the seed potatoes, and can slide out from an upper chute. Other seed potatoes with the long diameter and the shapes meeting the seed production requirement cannot cross the second sorting opening 10108, and then enter the second sorting railway 10106. The limiting pieces 106 are driven by the limiting stepping motor 107 to stir the seed potatoes to enter the limiting railway material falling opening 10109 one by one to perform periodic limiting and feeding. The limiting stepping motor 107 rotates at a constant rotating velocity. The space between two adjacently arranged limiting pieces 106 can only accommodate one seed potato. One-way equal-period movement of the limiting pieces 106 is realized through the cooperation of the ratchet wheel, the limiting pawl, and the cam. The velocity of the limiting pieces 106 is controlled to adjust the conveying time of a single seed potato, so as to realize ordered one-way feeding of the seed potatoes. Finally, the seed potatoes fall into the pre-cutting module 2 in a vertical state.

V shape positioning principle is utilized at the pre-cutting module 2. The small V-shaped rollers 20204 force the flexible conveyor belts 20201 to form a V-shaped clamping space to clamp a seed potato in a vertical state. The seed potato is adaptively positioned by the elasticity of the springs, so that the axes of the seed potatoes are placed at the central line of the system to the greatest extent. The seed potatoes go downward along with the rotation of the flexible conveyor belts 20201 due to the frictional force between the seed potatoes and the flexible conveyor belts 20201. The major axes of the seed potatoes rush at the arc-shaped blade 20101 at the lower part, so that the seed potatoes are symmetrically cut. The tail end of the arc-shaped blade 20101 has a thickness. In addition, the tail ends of the seed potatoes will also be subjected to be pushing action of the flexible conveyor belts 20201 after being cut, and are separated to two sides to fall onto the material bearing discs 302 of the bud eye identifying and cutting module 3 through the triangular separation mechanisms 201. In the material bearing disc circular grooves, the cutting surfaces of the seed potatoes are downward and the arc surfaces are upward.

In the bud eye identifying and cutting module 3, the working contents of the two halves of seed potatoes are the same. The seed potato reaches the identification process first under the intermittent rotation driving of the material bearing discs 302. The arc surfaces of the seed potatoes are photographed by using the Open MV camera 30304, and the number and position information of the bud eyes on the arc surface is collected. The height of the seed potato is measured by using the infrared ranging part 30303. The fuzzy calculation result of mass of the seed potato is fed back to a cutting algorithm database to analyze data, so as to plan out an optimal cutting mode. The cutting mode needs to ensure that at least two bud eyes are maintained on each cut piece. Meanwhile, the sizes of the cut pieces are required to be within a certain range to ensure that the mass of the cut piece is controlled to be 20 to 53 g, which ensures the germination percentage and nutrient supply in a growth process. The material bearing discs 302 continue moving intermittently to reach the cutting process. The cutter bank includes a pair of engaged gears and two types of cutters. The cutters are controlled by direct push type electromagnets. The electromagnets are embedded into a large toothed disc. The mounting hole is reserved in an end of the cutter, so as to facilitate mounting. The above-mentioned parts form an electromagnet cutter. The relay receives the instruction sent by the algorithm database to control the stepping motor to start or stop, and then controls the rotation of the gear to drive the electromagnet to rotate, thereby rotating the cutter to the optimal cutting position. The algorithm database further issues out an instruction to control the corresponding electromagnets to electrify and then control the V-shaped cutter or the I-shaped cutter to move downwards quickly, so that the seed potato is separated by cutting. The cutter penetrates through the cutter groove 30203 while cutting, and is immersed through the potassium permanganate sponge 30204 at the bottom layer of the material bearing disc 302, so as to realize single cutting disinfection. After being cut into pieces, the seed potatoes enter the next station along with the intermittent movement of the material bearing discs 302, and are humidified and disinfected through the spraying system 305. The spraying system 305 includes a spraying system liquid container 30501, and a spraying system spray nozzle 30502. The spraying system 305 is started or stopped or the chemical liquid is replaced according to the seed mixing requirements of different varieties of potatoes, which prepares for fully mixing with the mixing material and the plant ash or a novel reagent. After above work is completed, the seed tubers fall into the inlet of the material mixing module 4 under the action of the material bearing plate baffle plate 306.

The auger conveyor blade 40603 rotates in the vertical direction, so that the seed potato pieces are fully mixed with the plant ash or the novel solid chemical agent. The cut pieces are conveyed to the outlet of the material mixing module along with the rotation of the auger conveyor blade 40603, and are discharged for separate storage. The plant ash leaks back to the inlet through the gap of the auger conveyor blade 40603 due to the height difference of the material mixing drum 401, which reduces the waste and improves the utilization rate of the mixing material.

Mechanism analysis and theoretical calculation are provided as follows.

(1) Feeding module: the seed potatoes are finally changed from a disordered state into an ideal ordered state under the action of rotation and other forces after entering the feeding module 1.

The seed potatoes can be divided into two states in the process of falling into the conical bearing disc 102 and entering the limiting railway 101, that is, a positioning state or a non-positioning state. However, finally, there is only one force state after the seed potatoes enter the screening apparatus, that is, the positioned state. The seed potato force states at two limit state positions are analyzed as follows.

If the seed potato is in a positioning state (i.e., the long diameter of the seed potato is perpendicular to the diameter of the bearing disc), it is just an ideal position state, and at this time, the seed potato is only subjected to gravity G because the bearing disc rotates at a constant velocity.

Figure 16A:
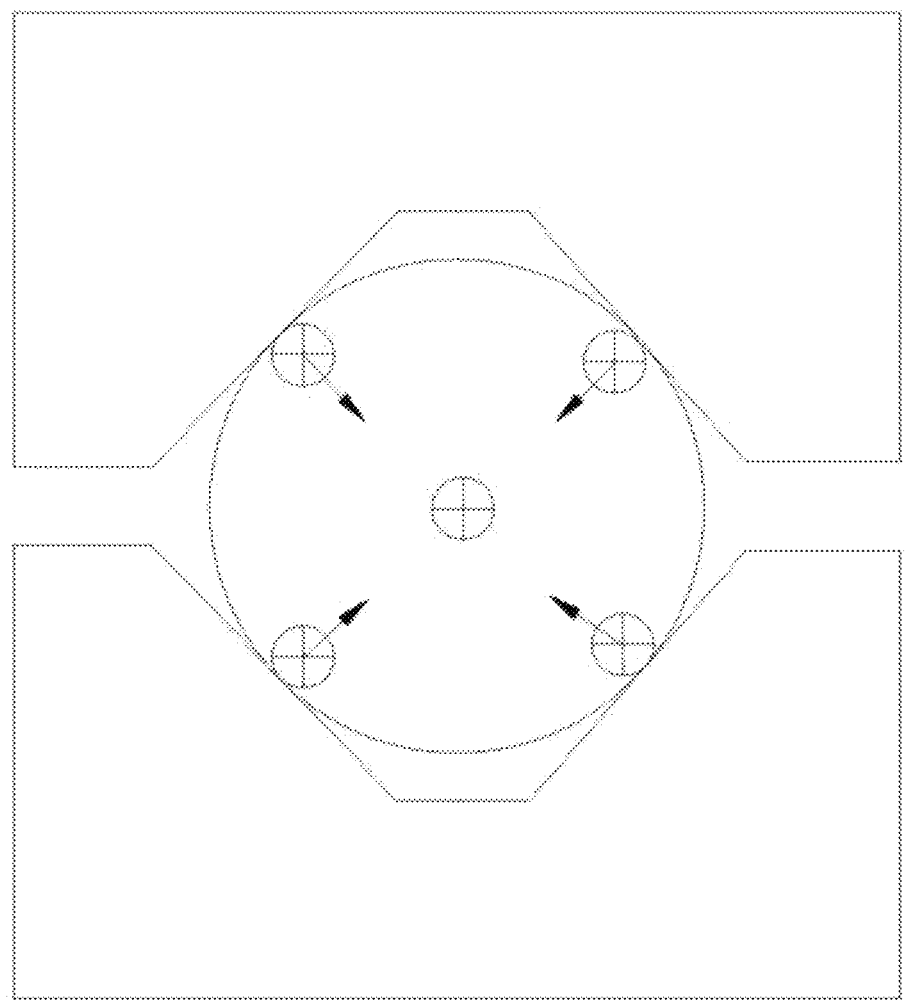
FIG. 16(a) is a force diagram of a seed potato under an elastic V shaped positioning action in some embodiments of the present disclosure.
Figure 16B:
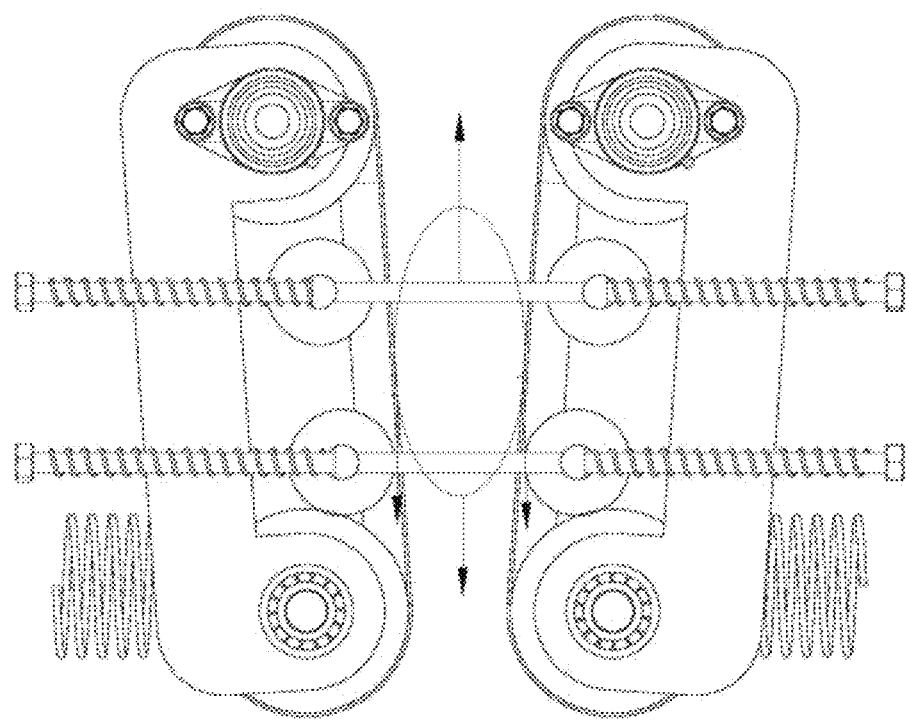
FIG. 16(b) is a force diagram in a process that the seed potato rushes at the arc-shaped cutter and is cut by the arc-shaped cutter in some embodiments of the present disclosure.
Figure 17:
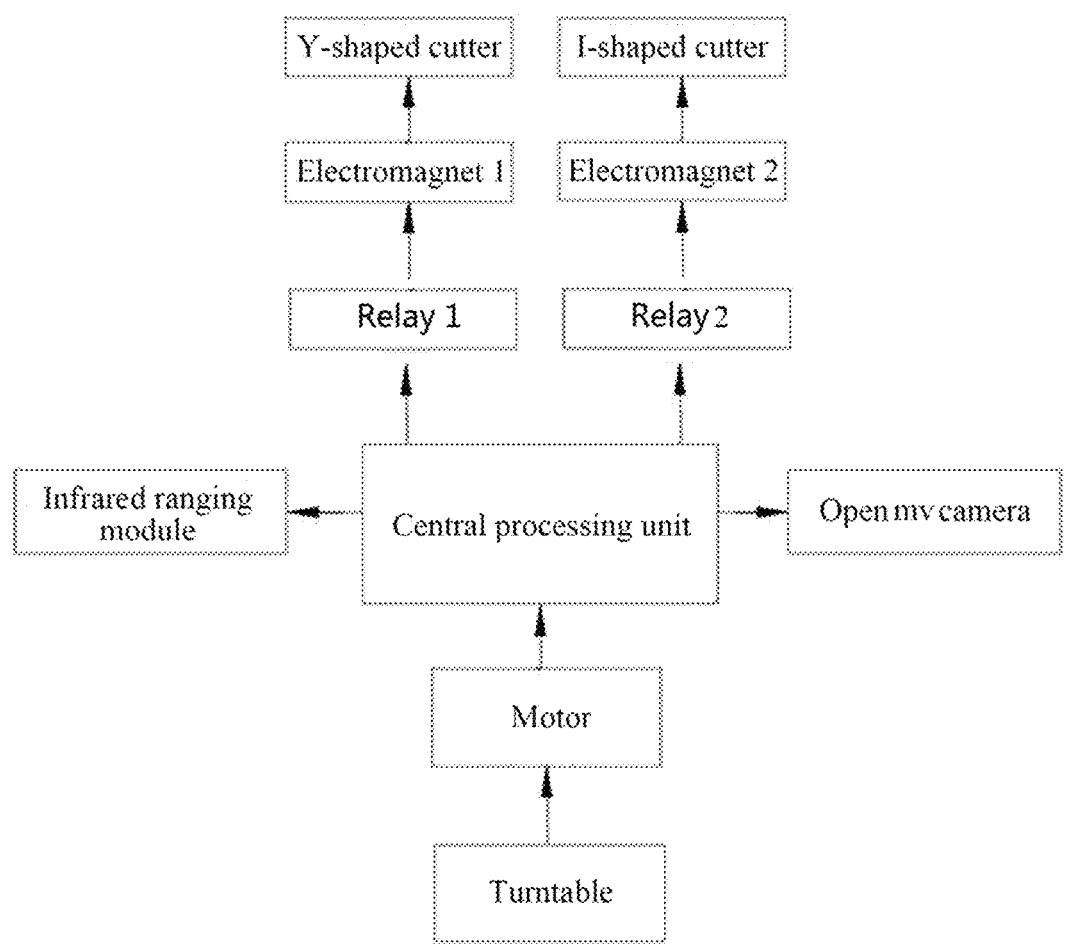
FIG. 17 is a schematic diagram of a cutter bank control module in some embodiments of the present disclosure.

If the seed potato is in a non-positioning state (i.e., the long diameter of the seed potato is parallel to the diameter of the conical bearing disc 102), it needs to be restricted by the limiting railway 101 to adjust the state. When the seed potato is in the conical bearing disc 102, its force analysis diagram is as shown in FIG. 16(*b*). At this time, the seed potato is subjected to the gravity G, the frictional force $f_1$, $f_2$ of the limiting railway 101, and the frictional force $F_f$ of the bearing disc 10201. The frictional force applied by the limiting railway 101 produces a clockwise torque $T_1$, and the conical bearing disc 102 will also produce an anticlockwise resistance torque, so the seed potato must reach the positioning state under the action of the torque.

The calculation formula for the frictional force is provided as follows:

$$F_f = uG = umg$$

However, the thrust F of the limiting pieces 106 is provided by a servo motor. For the mass of the seed potato, there must be:

$$F >> f_1 + f_2; \; T_1 >> T_2$$

The ordered seed potatoes enter the double-layer inclined rail. At the inlet of the first sorting railway 10105, preliminary screening is performed according to the medium diameter and short diameter of the seed potatoes. The seed potatoes with the medium diameter and short diameter less than the predetermined size of the first sorting opening 10104 are screened out, and directly fall into the material mixing module 4 for mixing with the mixing material for seed production, which greatly improves the seed production efficiency. Other seed potatoes satisfying the conditions continue sliding downward along the inclined surface. Then, elongated seed potatoes can cross the second sorting opening 10108 due to different positions of the gravity centers of the seed potatoes, and can slide out from the upper chute. Other seed potatoes with the long diameters and the shapes meeting the seed production requirement cannot cross the second sorting opening 10108, and then enter the second sorting railway 10106. The limiting pieces 106 are driven by the limiting stepping motor 107 to stir the seed potatoes to enter the limiting railway material falling opening 10109 one by one to perform periodic limiting and feeding. The limiting stepping motor 107 rotates at a constant rotating velocity. The space between two adjacently arranged limiting pieces 106 can only accommodate one seed potato. One-way period movement of the limiting pieces 106 is realized through the cooperation of the ratchet wheel, the limiting pawl, and the cam. The velocity of the limiting pieces 106 is controlled to adjust the conveying time of a single seed potato, so as to realize ordered one-way feeding of the seed potatoes. Finally, the seed potatoes fall into the pre-cutting module 2 in a vertical state. The seed potatoes in the inclined chute slide obliquely downward slowly. The seed potato gravity G is balanced with the component force $N_y$ of a chute supporting force N in the vertical direction, that is, G cos θ=$N_y$. Additionally, G Sin θ=$F_f$; θ is the inclination angle of the inclined chute; $F_f$ is the friction force produced by the inclined chute.

Determination of the limiting railway: if the seed potato is positioned on the upper layer of the limiting railway, assuming that the short diameter of the seed potato is a, if the seed potatoes need to pass the screening, then the minimal length of a leakage hole is a; if the seed potato cannot pass through the screening, assuming that the long diameter of the seed potato is b, then the maximum length of the leakage hole is b/2; if the seed potato is just in a critical state, that is, b=2a, and the length of the leakage hole is a. The length of the leakage hole can be determined as a. The elongated potatoes with the length of 2a and the large potatoes with the short diameter greater than a can be screened out.

Determination of slope angle: based on many experiments, a material can slide in the first sorting railway at a constant velocity at about 35°.

u=0.7 is obtained from f=u$F_N$.

The sliding velocity V of the material can be solved from the following formula:

$$V = \sqrt{2aL} \cdot (g \sin \alpha - ug \cos \alpha); \; a = g \sin \alpha - ug \cos \alpha.$$

Where, L is the sliding distance, a is acceleration screening, and α is an inclination angle. The desired velocity can be obtained through the formula by only controlling L and α.

Determination of screening leakage hole for seed potato less than 50 g:

20 seed potatoes are taken. Each seed potato is about 50 g with the error not exceeding 1. The seed potato is cut in half. The lengths of the long diameter and the short diameter are measured. 3 mm is added to each of the average long diameter and the average short diameter, the added average long diameter and the added average short diameter are respectively configured as the length and the width of an approximate rectangular leakage hole obtained after the projection of the seed potato. Based on the experiments, the length of the rectangular leakage hole is 63 mm, and the width is 43 mm. The seed potatoes less than 50 g can be ensured to directly fall into the material mixing apparatus through the leakage hole so as to mix the seed potato.

(2) Pre-Cutting Module

The treatment functions of the pre-cutting module for the seed potatoes of the whole equipment include elastic V shape positioning and impact cutting in half.

The realization of the function of the elastic V shape positioning mainly utilizes the self-positioning characteristic of a V-shaped block, which positions the seed potatoes with circular cross sections. The force analysis of the seed potato under the action:

when the seed potato is positioned by the V-shaped block, the seed potato is subjected to self-gravity G and the elastic force $F_{N1}$, $F_{N2}$, $F_{N3}$, $F_{N4}$ of the V-shaped block on the seed potato, the frictional force produced by the elastic force is $f_1$, $f_2$, $f_3$, $f_4$. Then, the following expressions are provided.

$$f_1 + f_2 + f_3 + f_4 = \mu(F_{N1} + F_{N2} + F_{N3} + F_{N4})$$

$$F_{N1} = kx_1; \; F_{N2} = kx_2; \; F_{N3} = kx_3; \; F_{N4} = kx_4.$$

Where, μ is the friction coefficient of the surface of the flexible conveyor belt.

When the material is cut by the arc-shaped blade in the triangular separation mechanism and the cross section of the material is in contact with the conical surface, the sliding friction coefficient changes. It can be known from experiments that the sliding friction coefficient is $\mu=0.84$ Therefore, the desired velocity can be obtained by controlling the length and the slope of the conical surface and substituting them into the above-mentioned formula.

K is an elasticity coefficient of a spring.

In this system, assuming that the seed potato is a regular ellipsoid, then the length changes of the four springs can be considered to be equal. If $x_1=x_2=x_3=x_4$, $F_{N1}=F_{N2}=F_{N3}=F_{N4}$; and $f_1=f_2=f_3=f_4$.

The direction of the frictional force has two situations. One situation is that, when the seed potato is not in contact with the arc-shaped blade, the flexible conveyor belt moves at a constant velocity under the driving of the transmission system, the seed potato is kept in a constant velocity linear movement state in the flexible conveyor belt. The frictional force of the flexible conveyor belt acting on the surface of the seed potato is used for balancing the gravity of the seed potato to meet an expected positioning function requirement. At this time, the direction of the surface frictional force of the seed potato acted by the flexible conveyor belt is upward. The material of the springs of the product adopts grade C, carbon spring steel wires. When the seed potato enters the system to extrude the spring of the V-shaped rollers, and the springs are compressed, the frictional force finally acting on the seed potato by the elastic force produced from the spring with the elasticity coefficient K can satisfy a balancing condition, that is $$f_1=f_2=f_3=f_4=G$$

The other situation is a process that the seed potato rushes at the streamlined cutter to be cut by the streamlined cutter under the driving of the flexible conveyor belt. In this process, because the influence of the component force in the horizontal direction on the realization of the function during the process can be ignored, only the actions of the component forces of various forces in the vertical direction are analyzed. It is apparent that the gravity of seed potato is not enough to resist the resistance F' of the streamline cutter on the seed potato to cut the seed potato completely; therefore, the direction of the frictional force acting on the seed potato by the flexible conveyor belt is changed from upward to downward to act as an external force to assist the gravity to cut the seed potato. Therefore, the balancing condition of the force is provided as follows:

$$f_1+f_2+f_3+f_4+G=F'$$

It can be known from the above formula that, if this mechanism needs to achieve the desired effect, the frictional force acting on the seed potato by the flexible conveyor belt needs to satisfy the following formula.

$$(f_1+f_2+f_3+f_4)>(F'-G)$$

That is as follows.

$$x_1=x_2=x_3=x_4>\frac{F'-G}{4k\mu}$$

Through theoretical calculation, the amount of compression of the spring caused by the seed potato is greater than the value of the $$\frac{F'-G}{4k\mu}$$

calculated by the parameters of the selected flexible conveyor belt and the spring.

(3) Bud Eye Identifying and Cutting Module

Two electromagnets are uniformly arranged at the cutting station. Blades are welded at the head of each electromagnet to form the cutter bank. The quality of the cut pieces is determined by the stroke and the pushing force of the electromagnets according to the working situation of the cutting station. During cutting, in order to meet the cutting requirements, a KK-1564B push-pull electromagnet is selected. Specific working parameters are as shown in Table 1.

TABLE 1

Working parameters of KK-1564B push-pull electromagnet

| Voltage | Current | Stroke | Diameter of iron core | Weight | Electrifying time |
|---|---|---|---|---|---|
| DC 12 V | 2000 A | 35 mm | 15 mm | 352 G | <2 s |

During cutting, the push-pull electromagnet performs a pop-up action to push the blade to cut. At this time, the thrust output by the push-pull electromagnet is as follows.

$$F_1=\frac{B^2S}{2\mu}$$

Where, B is a magnetic induction intensity; S is a cross section area of the iron core; μ is a magnetic conductivity.

Finally, the KK-1564B push-pull electromagnet can produce a pushing/pulling force of 6 to 10 kg, which completely meets the seed potato cutting requirements.

The present embodiment further provides a seed potato production method, which uses the intelligent seed production apparatus based on multistage screening and bud eye identification, and includes the following steps.

Seed potatoes to be screened are positioned and ordered, and mass screening is performed to screen out special-shaped seed potatoes and elongated seed potatoes.

The seed potatoes to be processed are symmetrically cut along the symmetry planes where the major axes of the seed potatoes are positioned.

The number and position information of bud eyes on the surfaces of the seed potato pieces obtained by cutting the seed potatoes in half and the volumes of the seed potato pieces are respectively collected, and the number of cut pieces and a cutter solution are determined according to the collected information.

The seed potatoes are cut according to the determined cutter solution;

The tubers obtained by cutting are fully mixed with a mixing material to realize disinfection and antiseptic treatment of the tubers.

Although the specific implementation manners of the present disclosure have been described in combination with the drawings, it is not a limitation on the scope of protection of the present disclosure. Those skilled in the art should understand that on the basis of the technical solution of the present disclosure, various modifications or deformations that can be made by those skilled in the art without creative work are still within the scope of protection of the present disclosure.

What is claimed is:

1. A seed production apparatus, comprising:
a feeding module, which feeds seed potatoes with mass and shapes meeting requirements, screened out through a multistage screening and limiting mechanism;
a pre-cutting module, which receives the seed potatoes discharged from the feeding module, and cut each seed potato into two halves along a symmetry plane where a major axis of the seed potato is positioned;
a bud eye identifying and cutting module, which receives seed potato pieces discharged from the pre-cutting module, determines a weight of each seed potato piece, identifies bud eye distribution on a surface of the seed potato piece, and cuts the seed potato piece into a plurality of tubers as required, so that bud eyes are uniformly distributed on different tubers in number; and,
a material mixing module, which receives the tubers and complete mixing of the tubers with a mixing material;
wherein the bud eye identifying and cutting module comprises:
a material bearing disk, wherein the material bearing disc is provided with four pairs of material bearing disc circular grooves;
the material bearing disc rotates along a vertical axis, such that each pair of material bearing disc circular grooves is switched among a material falling station, an identification station, a cutting station, and a disinfection station;
the material bearing disc circular grooves at the material falling station receive the seed potato pieces discharged from the pre-cutting module; and,
an identification assembly is arranged above the identification station, wherein the identification assembly identifies a position distribution of the bud eyes on an external circular surface of each seed potato piece and a weight of the seed potato piece; and transmits information to a control system, wherein the control system outputs an instruction about a cutting number and a cutter cutting solution to a cutter assembly according to a preset program, and the seed potato pieces at the cutting station are cut into the tubers as required by the cutter assembly;
wherein the bud eye identifying and cutting module comprises a fixing plate that is arranged horizontally; the fixing plate is supported through a machine frame; and
the identification assembly and the cutter assembly are arranged on a lower end surface of the fixing plate, the identification assembly comprises a camera and an infrared ranging part; and, is positioned right above the identification station;
arc-shaped blades in different structural forms are extended out from the cutter assembly, and the cutter assembly drives the arc-shaped blades to rotate along vertical axes thereof, so as to adapt to the instruction output from the control system.

2. The apparatus of claim 1, wherein,
the feeding module comprises a bearing disc that rotates along a central axis thereof, wherein the central axis of the bearing disc is vertically arranged, and the bearing disc bears the seed potatoes to be screened;
the multistage screening and limiting mechanism is mounted on an upper surface of the bearing disc and comprises a limiting railway, wherein the limiting railway
receives the seed potatoes in the bearing disc;
conveys the seed potatoes in a predetermined direction; and,
outputs the seed potatoes from different openings, to obtain seed potatoes each having a mass less than a minimum mass, seed potatoes each having a mass greater than a maximum mass and a shape not meeting a requirement, and/or seed potatoes each having a mass between the minimum mass and the maximum mass;
wherein the different openings comprises a first sorting opening for screening out the seed potatoes each having a mass less than a minimum mass through opening size limitation; a second sorting opening for performing shape screening to screen out the seed potatoes each having a mass between the minimum mass and the maximum mass; and a third opening for outputting the seed potatoes each having a mass greater than a maximum mass and a shape not meeting a requirement.

3. The apparatus of claim 1, wherein,
the pre-cutting module comprises two flexible conveyor belts that are arranged side by side;
a V-shaped clamping space is formed between the two flexible conveying belts; an upper opening of the V-shaped clamping space receives the seed potatoes with the mass and shapes meeting the requirements screened out from the feeding module, and conveys the seed potatoes downward; and, a lower opening of the V-shaped clamping space is provided with a pre-cutting assembly; and
the pre-cutting assembly cuts each seed potato output from the V-shaped clamping space into two halves along the symmetry plane where the major axis is positioned.

4. The apparatus of claim 3; wherein,
the pre-cutting assembly comprises a triangular body;
an arc-shaped blade is arranged at an upper sharp corner of the triangular body; and, the arc-shaped blade directly faces the lower opening of the V-shaped clamping space.

5. The apparatus of claim 1; wherein,
the material mixing module comprises an auger conveyor;
the auger conveyor conveys the tubers obliquely upwards;
an opening at a lower end of the auger conveyor receives the tubers output from the bud eye identifying and cutting module;
the auger conveyor comprises a housing; and,
a mixing material is arranged in an inner cavity of the housing.

6. The apparatus of claim 5, wherein spiral blades are mounted on a rotating shaft of the auger conveyor; and, the spiral blades are each of a hollow structure.

* * * * *